United States Patent
Cai et al.

(10) Patent No.: US 12,105,225 B2
(45) Date of Patent: Oct. 1, 2024

(54) SYSTEMS AND METHODS FOR CALIBRATING A LIDAR DEVICE

(71) Applicant: Velodyne Lidar USA, Inc., San Jose, CA (US)

(72) Inventors: Zhongping Cai, San Jose, CA (US); Geovany Ramirez, San Jose, CA (US); Ayush Shah, San Jose, CA (US); Shing Leung Luk, San Jose, CA (US); Marcus Smith, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1052 days.

(21) Appl. No.: 16/852,128

(22) Filed: Apr. 17, 2020

(65) Prior Publication Data

US 2021/0325520 A1    Oct. 21, 2021

(51) Int. Cl.
*G01S 7/497* (2006.01)
*G01S 7/481* (2006.01)
*G01S 17/42* (2006.01)
*G01S 17/89* (2020.01)
*G05B 19/4061* (2006.01)

(52) U.S. Cl.
CPC ............ *G01S 7/497* (2013.01); *G01S 7/4817* (2013.01); *G01S 17/42* (2013.01); *G01S 17/89* (2013.01); *G05B 19/4061* (2013.01); *G05B 2219/37288* (2013.01); *G05B 2219/37558* (2013.01)

(58) Field of Classification Search
CPC ..... G01S 7/497; G01S 17/89; G05B 19/4061; G05B 2219/37288; G05B 2219/37558
USPC .......................................... 356/4.01; 378/207
See application file for complete search history.

(56) References Cited

U.S. PATENT DOCUMENTS

| | | | |
|---|---|---|---|
| 5,831,719 A | 11/1998 | Berg et al. | |
| 8,777,485 B2* | 7/2014 | Holt | A61B 6/583 |
| | | | 250/252.1 |
| 11,246,559 B2* | 2/2022 | Bornefalk | A61B 6/585 |
| 2007/0048501 A1 | 3/2007 | Chirhart et al. | |
| 2013/0049641 A1* | 2/2013 | Sheynblat | G01S 7/497 |
| | | | 250/221 |
| 2013/0282277 A1* | 10/2013 | Rubin | G08G 1/09 |
| | | | 701/517 |
| 2016/0282453 A1* | 9/2016 | Pennecot | G01S 17/89 |
| 2016/0370285 A1* | 12/2016 | Jang | C08J 3/005 |

(Continued)

FOREIGN PATENT DOCUMENTS

| EP | 0669869 B1 | 9/1995 |
|---|---|---|
| EP | 2769248 B1 | 8/2014 |

OTHER PUBLICATIONS

"Reflectivity", 2004, 3M (Year: 2004).*

(Continued)

*Primary Examiner* — Yuqing Xiao
*Assistant Examiner* — Benjamin Richard Hebert
(74) *Attorney, Agent, or Firm* — Kilpatrick Townsend & Stockton LLP

(57) ABSTRACT

Systems and methods for calibrating a LiDAR device are disclosed. According to one embodiment, the system comprises a LiDAR device, a continuous curved target at a fixed distance from the LiDAR device, and a calibration controller operable to perform a reflectance over range calibration of the LiDAR device. The LiDAR device scans portions of the continuous curved target at different ranges during the calibration.

16 Claims, 15 Drawing Sheets

(56) References Cited

U.S. PATENT DOCUMENTS

| | | | |
|---|---|---|---|
| 2018/0014809 A1* | 1/2018 | Lin | A61B 6/461 |
| 2018/0267142 A1* | 9/2018 | Motoyama | G06V 20/647 |
| 2019/0170865 A1 | 6/2019 | Sasaki | |
| 2019/0204425 A1* | 7/2019 | Abari | G01S 7/497 |
| 2019/0212422 A1 | 7/2019 | Yang et al. | |
| 2019/0250258 A1* | 8/2019 | Crawford | G02F 1/0115 |
| 2019/0258899 A1* | 8/2019 | Coogan | G06V 20/188 |
| 2019/0377092 A1* | 12/2019 | Wiebold | G01S 17/95 |
| 2020/0041652 A1* | 2/2020 | Jain | G05D 1/024 |
| 2020/0124732 A1* | 4/2020 | Sutherland | G01S 7/4813 |
| 2020/0284887 A1* | 9/2020 | Wachter | G01S 13/867 |
| 2020/0391704 A1* | 12/2020 | Arunmozhi | B25J 9/1697 |
| 2020/0408510 A1* | 12/2020 | Drouin | G01B 11/002 |
| 2020/0410715 A1* | 12/2020 | Cadien | G01S 13/867 |
| 2021/0051317 A1* | 2/2021 | Yan | G06T 7/80 |
| 2021/0181319 A1* | 6/2021 | Alismail | G01S 7/4802 |
| 2021/0316669 A1* | 10/2021 | Wang | G01S 7/4086 |
| 2022/0086988 A1* | 3/2022 | Coleman | H05B 47/11 |

OTHER PUBLICATIONS

Fang, Wei et al., "Intensity Correction of Terrestrial Laser Scanning Data by Estimating Laser Transmission Function", Feb. 2015, IEEE, IEEE Transactions on Geoscience and Remote Sensing, vol. 53, No. 2, pp. 942-951 (Year: 2015).*

Kaasalainen, Sanna et al., "Radiometric Calibration of LIDAR Intensity With Commercially Available Reference Targets", Feb. 2009, IEEE, IEEE Transactions on Geoscience and Remote Sensing, vol. 47, No. 2, pp. 588-598 (Year: 2009).*

Thome, Kurt et al., "Vicarious Calibration of ASTER via the Reflectance-Based Approach", Oct. 2008, IEEE, IEEE Transactions on Geoscience and Remote Sensing, vol. 46, No. 10, pp. 3285-3295 (Year: 2008).*

Kashani, Alireza et al., "A Review of LIDAR Radiometric Processing: From Ad Hoc Intensity Correction to Rigorous Radiometric Calibration", Nov. 6, 2015, MDPI, Sensors 2015, pp. 28099-28128 (Year: 2015).*

Kuusk, Andres et al., "Reflectance reference target at Järvselja, Estonia for the calibration of optical remote sensing sensors and lessons learned", Jun. 29, 2018, Elsevier B.V., Int J Appl Earth Obs Geoinformation 73, pp. 191-196 (Year: 2018).*

"Reflectance", Apr. 3, 2020, Wikipedia (as captured by the WayBack Machine) (Year: 2020).*

Proof of Prior Public Availability for the above source (Year: 2020).*

Screenshots of page from 3M: "3Mtm Diamond Gradetm DG3 Reflective Sheting 4090, White, Configurable", 2023 (not presently being used as prior art) (Year: 2023).*

Levinson, Jesse et al., "Unsupervised Calibration for Multi-beam Lasers", 2014, Springer-Verlag Berlin Heidelberg, Springer Tracts in Advanced Robotics 79, pp. 179-193 (Year: 2014).*

International Searching Authority for PCT Application No. PCT/US2021/027084, Invitation to Pay Additional Fees and Where Applicable, Protest Fee dated Jul. 23, 2021.

International Search Report and Written Opinion for International Patent Application No. PCT/US021/027084, dated Nov. 2, 2021 (128 pages).

International Preliminary Report on Patentability for PCT Application No. PCT/US2021/027084, dated Oct. 27, 2022, (17 Pages).

* cited by examiner

For LiDAR, the emitted light source 110 is a laser

250

Single emitter/detector pair oscillating mirror LIDAR design

| | $P_0$ | $P_1$ | $P_2$ |
|---|---|---|---|
| $I_0$ | min($R_{CALR-PRI}$) | min($R_{CALR-PRI}$) | min($R_{CALR-PRI}$) |
| $I_1$ | { $R_{CALR-PRI}$ } | | |
| $I_2$ | | | |
| $I_3$ | max($R_{CALR-PRI}$) | { $R_{CALR-PRI}$ } | |
| $I_4$ | | | |
| $I_5$ | | | { $R_{CALR-PRI}$ } |
| $I_6$ | { $R_{CALR-EXT}$ } | | |
| $I_7$ | | max($R_{CALR-PRI}$) | |
| $I_8$ | | | |
| $I_9$ | max($R_{CALR-EXT}$) | | |
| $I_{10}$ | | { $R_{CALR-EXT}$ } | |
| $I_{11}$ | | | max($R_{CALR-PRI}$) |
| $I_{12}$ | | | |
| $I_{13}$ | | | |
| $I_{14}$ | | max($R_{DIFF-EXT}$) | |
| $I_{15}$ | | | { $R_{CALR-EXT}$ } |
| $I_{16}$ | | | |
| $I_{17}$ | | | |
| $I_{18}$ | | | |
| $I_{19}$ | | | max($R_{CALR-EXT}$) |
| ... | | | |
| $I_{MAX}$ | | | |

FIG. 5D

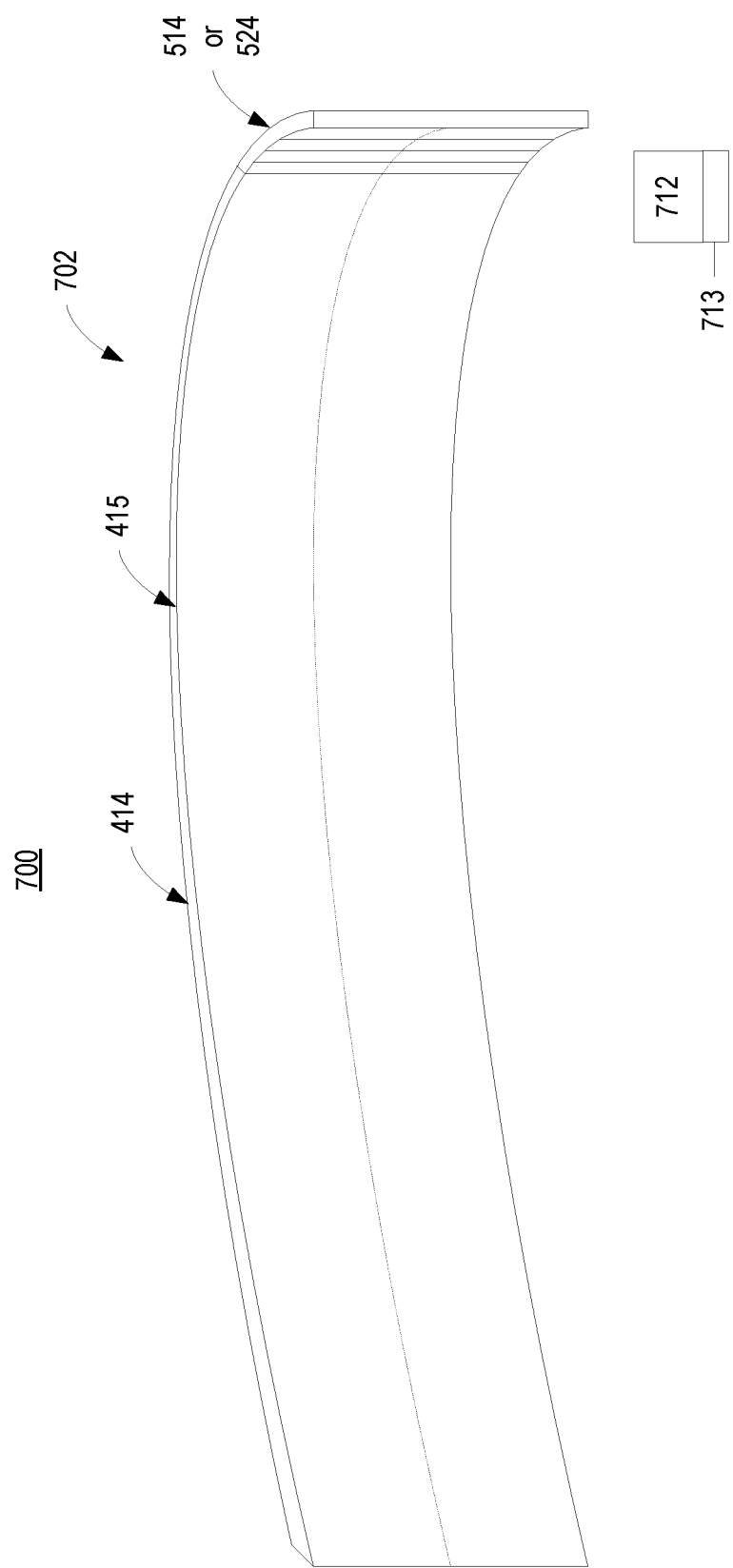

SYSTEMS AND METHODS FOR CALIBRATING A LIDAR DEVICE

FIELD OF TECHNOLOGY

The present disclosure relates generally to systems and methods for calibrating light detection and ranging ("LiDAR") devices, and more particularly, to high-speed techniques for calibrating multi-channel LiDAR devices to provide accurate and high-resolution measurements of reflectance.

BACKGROUND

Light detection and ranging ("LiDAR") systems use one or more LiDAR devices to measure the attributes (e.g., shape, contour, etc.) of their surrounding environments. LiDAR systems have numerous applications in a wide variety of fields, including surveying, robotics, geology and soil science, agriculture, and autonomous navigation. For example, autonomous vehicles may use multi-channel LiDAR devices to detect and avoid obstacles while navigating safely through dynamic environments.

In a multi-channel LiDAR device, optical transmitters are paired with optical receivers to form multiple "channels." In operation, each channel's transmitter emits an optical signal (e.g., laser) into the device's environment and detects the portion of the signal that is reflected back to the channel's receiver by the surrounding environment. In this way, each channel provides "point" measurements of the environment, which can be aggregated with the point measurements provided by the other channels to form a "point cloud" of measurements of the environment.

The measurements collected by a LiDAR channel may be used to determine the distance ("range") from the device to the surface in the environment that reflected the channel's transmitted optical signal back to the channel's receiver, as well as the reflectance of that surface. The range to a surface may be determined based on the time of flight of the channel's signal (e.g., the time elapsed from the transmitter's emission of the optical signal to the receiver's reception of the return signal reflected by the surface). The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Systems and methods for calibrating a LiDAR device are disclosed. According to one embodiment, the system comprises a LiDAR device, a continuous curved target at a fixed distance from the LiDAR device, and a calibration controller operable to perform a reflectance over range calibration of the LiDAR device, wherein the calibration comprises the LiDAR device scanning portions of the continuous curved target at a plurality of different ranges.

According to another embodiment, a method for calibrating a LiDAR device comprises performing reflectance over range calibration of a LiDAR device, including: scanning, with the LiDAR device, portions of a continuous curved target at a plurality of different ranges, wherein the continuous curved target is disposed at a fixed distance from the LiDAR device; and generating a reflectance correction map for the LiDAR device based, at least in part, on information derived from the scanning of the portions of the continuous curved target at the plurality of different ranges.

According to another embodiment, a system comprises a LiDAR device; an arcuate target comprising a plurality of panels of reflective material, wherein each of the panels has a different nominal reflectance value and each of the panels is disposed at a same baseline distance from the LiDAR device; and a calibration controller operable to perform a baseline reflectance calibration of the LiDAR device for a plurality of reflectance values in a primary portion of a reflectance calibration range and for a plurality of reflectance values in an extended portion of the reflectance calibration range, wherein the baseline reflectance calibration comprises the LiDAR device scanning the panels of the arcuate portion of the continuous curved target at the baseline distance.

According to another embodiment, a method for calibrating a LiDAR device comprises performing a baseline reflectance calibration of the LiDAR device for a plurality of reflectance values in a primary portion of a reflectance calibration range and for a plurality of reflectance values in an extended portion of the reflectance calibration range, including: scanning, by the LiDAR device, an arcuate target including a plurality of panels of reflective material, wherein each of the panels has a different nominal reflectance value, and each of the panels is disposed at a same baseline distance from the LiDAR device, and generating a baseline reflectance map for the LiDAR device based, at least in part, on information derived from the scanning of the panels of the arcuate target at the baseline distance.

According to another embodiment, a reflective panel comprises a layer of retro-reflective material having a surface with a nominal reflectance between 1% and 100% retro-reflectance; and one or more layers of covering material disposed on the surface of the layer of retro-reflective material, wherein the one or more layers of covering material include an uppermost layer of covering material, wherein a nominal reflectance of a reflection point on the uppermost layer of covering material is between 100% diffuse reflectance and the nominal reflectance of the surface of the layer of retro-reflective material.

According to another embodiment, a panel fabrication method comprises: depositing one or more layers of covering material on a surface of a layer of retro-reflective material, wherein the one or more layers of covering material include an uppermost layer of covering material, wherein a nominal reflectance of the surface of the layer of retro-reflective material is between 1% and 100% retro-reflectance, and wherein a nominal reflectance of a reflection point on the uppermost layer of covering material is between 100% diffuse reflectance and the nominal reflectance of the surface of the layer of retro-reflective material.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 5D shows a baseline reflectance map covering primary and extended portions of a reflectance calibration range, in accordance with some embodiments.

FIG. 7 shows an environment for performing reflectance over range calibration and/or baseline reflectance calibration of a LiDAR device, in accordance with some embodiments.

Figure 1:
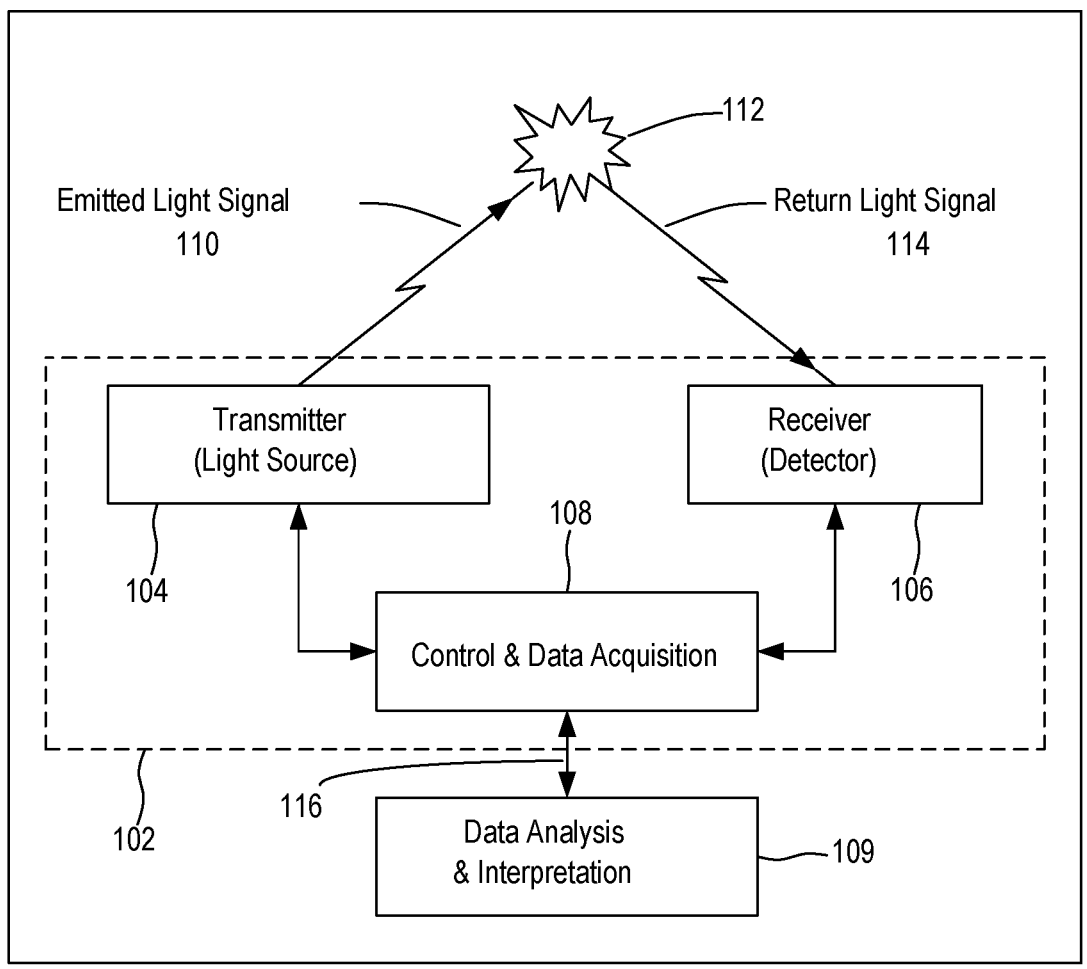
FIG. 1 is an illustration of the operation of an example of a LiDAR device.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for calibrating a LiDAR device are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Motivation for Some Embodiments

There can be substantial variance between the uncalibrated measurements of reflectance provided by two channels of distinct LiDAR devices or two distinct channels of the same LiDAR device, even if the two channels are measuring return signals reflected by the same target, at the same distance, and under the same conditions. Likewise, there can be substantial variance among the uncalibrated measurements of reflectance provided by the same channel of a LiDAR device for a single target if the measurements are obtained at different ranges from the target.

Thus, the responses of LiDAR channels may be calibrated using various calibration techniques, and the calibration data may be used to correct the measurements of reflectance provided by the LiDAR channels. In general, such calibration is performed using targets with National Institute of Standards and Technology (NIST) traceable reflectance values.

One type of calibration (sometimes referred to herein as "reflectance over range" calibration or "over distance" calibration) can be performed with targets at different distances (e.g., up to hundreds of meters) to correct for the variation in a LiDAR channel's response over distance. For this type of calibration, one option is to use a limited number of targets at specific distances $(D_1, D_2, \ldots, D_N)$ from the LiDAR device to calibrate a channel's response at those distances. The correction to a channel's response at an intermediate distance $D_1$ between two calibrated distances $D_1$ and $D_2$ can then be estimated by interpolating between the response corrections corresponding to $D_1$ and $D_2$. However, this technique's limited resolution of distance leads to limited resolution of reflectance, as described in further detail below. Another option is to move a target over distance relative to a LiDAR device (or move the LiDAR device over distance relative to the target) during calibration of the LiDAR device, to provide higher resolution of distance and therefore obtain higher resolution of reflectance. However, with this approach it may be difficult to efficiently calibrate multiple channels of a LiDAR device at the same time, due to the relative motion between the LiDAR device and the target. In particular, LiDAR channels at the top and bottom of a device's vertical field of view may not continue to point at that target as the distance between the target and the LiDAR device increases.

Another type of calibration (sometimes referred to herein as "baseline reflectance" calibration) can be performed with a target at a fixed distance for a full range of emitter power levels. For this type of calibration, one option is to use a target with a limited number of panels having NIST traceable reflectance values ($R_1, R_2, \ldots, R_M$) between 0% and 100% diffuse reflectance to calibrate a channel's response to those reflectance values at the fixed distance. The correction to a channel's response for an intermediate reflectance $R_I$ between two calibrated reflectance values $R_1$ and $R_2$ can then be estimated by interpolating between the response corrections corresponding to $R_1$ and $R_2$. However, restricting the calibration to reflectance values between 0% and 100% diffuse reflectance leads to limited resolution of reflectance, as described in further detail below.

When configured in accordance with the above-described calibration techniques, LiDAR devices tend to measure reflectance inaccurately and with low resolution, which can cause systems that rely on LiDAR devices for accurate environmental data to fail. For example, in the context of autonomous navigation, the use of low-resolution and/or inaccurate measurements of reflectance can lead to navigational errors, which can cause an autonomous vehicle to navigate inefficiently or even collide with other things in the environment. Thus, there is a pressing need for improved techniques for calibrating LiDAR devices to measure reflectance accurately and with high resolution.

LiDAR Devices

A light detection and ranging ("LiDAR") system may be used measure the shape and contour of the environment surrounding the system. LiDAR systems may be applied to numerous applications including autonomous navigation and aerial mapping of surfaces. In general, a LiDAR system emit light pulses that are subsequently reflected by objects within the environment in which the system operates. The time each pulse travels from being emitted to being received (i.e., time-of-flight, "TOF") may be measured to determine the distance between the LiDAR system and the object that reflects the pulse. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 is an illustration of the operation of a LiDAR device, according to some embodiments. The LiDAR components 102 of a LiDAR device may include a transmitter 104 that transmits an emitted light signal 110, a receiver 106 comprising a detector, and a system control and data acquisition module 108. The LiDAR components 102 may be referred to collectively as a LIDAR transceiver. In operation, the emitted light signal 110 propagates through a medium and reflects off an object 112, whereby return light signal 114 propagates through the medium and is received by receiver 106.

The control and data acquisition module 108 may control the light emission by the transmitter 104 and record data derived from the return light signal 114 detected by receiver 106. In some embodiments, the control and data acquisition module 108 controls the power level at which the transmitter operates when emitting light. For example, the transmitter 104 may be configured to operate at a plurality of different power levels, and the control and data acquisition module 108 may select the power level at which the transmitter 104 operates at any given time. Any suitable technique may be used to control the power level at which the transmitter 104 operates. In some embodiments, the control and data acquisition module 108 determines (e.g., measures) characteristics of the return light signal 114 detected by the receiver 106. For example, the control and data acquisition module 108 may measure the intensity of the return light signal 114 using any suitable technique.

The transceiver of the LiDAR device may include one or more optical lenses and/or mirrors (not shown). The transmitter 104 may emit a laser beam having a plurality of pulses in a particular sequence. Design elements of the receiver 106 may include its horizontal field of view (hereinafter, "FOV") and its vertical FOV. One skilled in the art will recognize that the FOV parameters effectively define the visibility area relating to the specific LiDAR device. More generally, the horizontal and vertical FOVs of a LiDAR system may be defined by a single LiDAR device (e.g., sensor) or may relate to a plurality of configurable sensors (which may be exclusively LiDAR sensors or may include different types of sensors). The FOV may be considered a scanning area for a LIDAR system. A scanning mirror may be utilized to obtain a scanned FOV.

The LiDAR device may also include a data analysis & interpretation module 109, which may receive an output via connection 116 from the control and data acquisition module 108 and perform data analysis functions. The connection 116 may be implemented using a wireless or non-contact communication technique.

Figure 2A:
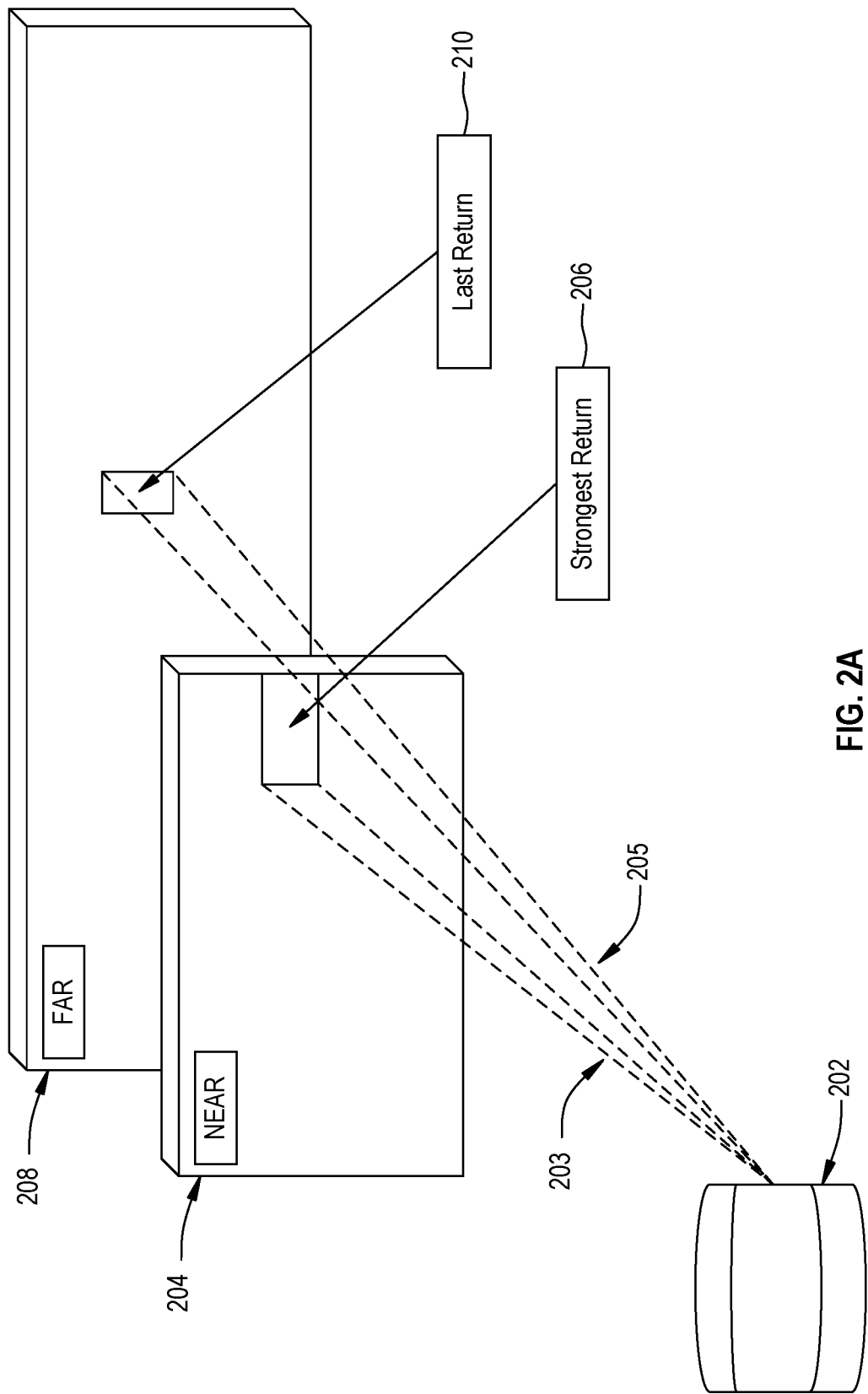
FIG. 2A is another illustration of the operation of an example of a LiDAR device.

FIG. 2A is an illustration of the operation of a LiDAR device 202, in accordance with some embodiments. In the example of FIG. 2A, two return light signals 203 and 205 are shown. Laser beams generally tend to diverge as they travel through a medium. Due to the laser's beam divergence, a single laser emission often hits multiple objects producing multiple return signals. The LiDAR device 202 may analyze multiple return signals and report one of the return signals (e.g., the strongest return signal, the last return signal, etc.) or both return signals. In the example of FIG. 2A, LiDAR device 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. In both single and multiple return LiDAR systems, it is important that each return signal is accurately associated with the transmitted light signal so that an accurate TOF is calculated.

Some embodiments of a LIDAR device may capture distance data in a two-dimensional ("2D") (e.g., single plane) point cloud manner. These LIDAR devices may be used in industrial applications, or may be repurposed for surveying, mapping, autonomous navigation, and other uses. Some embodiments of these devices rely on the use of a single laser emitter/detector pair combined with a moving mirror to effect scanning across at least one plane. This mirror may reflect the emitted light from the transmitter (e.g., diode), and may also reflect the return light to the receiver (e.g., detector). Use of an oscillating mirror in this manner may enable the LiDAR device to achieve 90-180-360 degrees of azimuth (horizontal) view while simplifying both the system design and manufacturability. Many applications require more data than just a single 2D plane. The 2D point cloud may be expanded to form a three dimensional ("3D") point cloud, where multiple 2D clouds are used, each pointing at a different elevation (vertical) angle. Design elements of the receiver of the LiDAR device 202 may include the horizontal FOV and the vertical FOV.

Figure 2B:
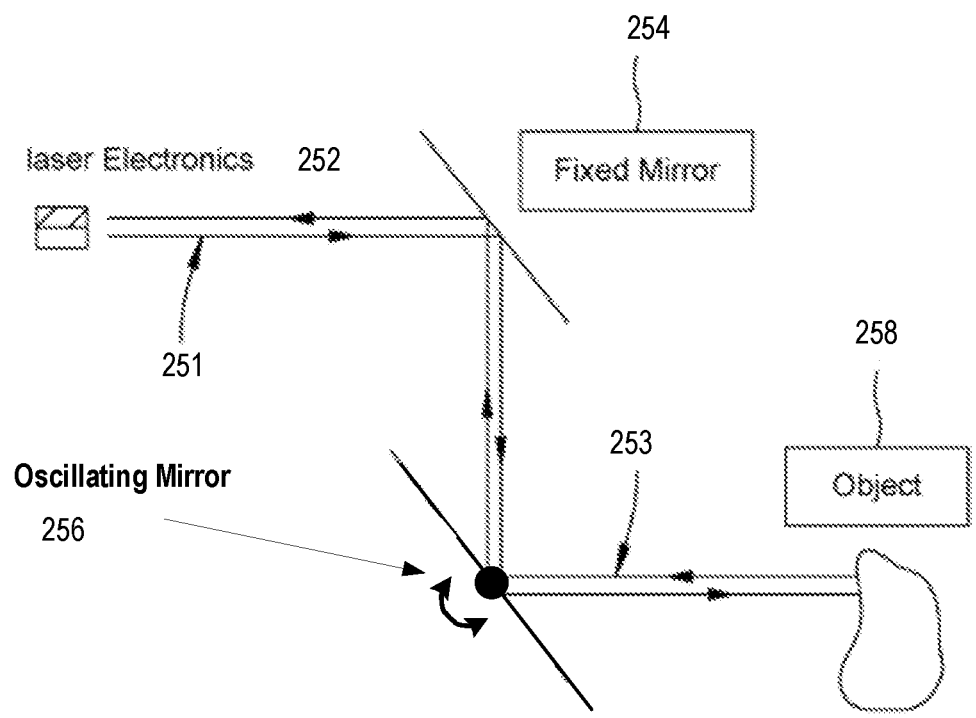
FIG. 2B is an illustration of an example of a LiDAR device with an oscillating mirror.

FIG. 2B is an illustration of the operation of a LiDAR device 250 with an oscillating mirror, according to some embodiments. In the example of FIG. 2B, the LiDAR device 250 uses a single laser emitter/detector pair combined with an oscillating mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the oscillating mirror 256 may oscillate at very high speeds (e.g., thousands of cycles per minute).

The LiDAR device 250 may include laser electronics 252, which may include a single light emitter and light detector. The emitted laser signal 251 may be directed to a fixed mirror 254, which may reflect the emitted laser signal 251 to the oscillating mirror 256. As oscillating mirror 256 "oscillates," the emitted laser signal 251 may reflect off an object 258 in its propagation path. The reflected signal 253 may be coupled to the detector in laser electronics 252 via the oscillating mirror 256 and the fixed mirror 254. Design elements of the receiver of LIDAR device 250 may include the horizontal FOV and the vertical FOV, which defines a scanning area.

Reflectance Over Range Calibration

One process for calibrating a channel of a LiDAR device to account for the effects of range on the intensity of a return signal generally involves (1) emitting light signals toward a small number of target surfaces of known reflectance, which are positioned at various distances from the device, (2) receiving the return signals, (3) calculating uncorrected reflectance values based on the intensities of the return signals and the ranges to the target surfaces, (4) calculating "correction factors" that can be combined with the uncorrected reflectance values to produce the expected reflectance values, and (5) storing the correction factors in a table indexed by range. In operation, when a channel receives a return signal from a surface at range $D_S$ with an uncorrected reflectance value $R_U$, the sensor can look up the reflectance correction factor $C_{DS}$ for surfaces at range $D_S$ in the table and combine $R_U$ and $C_{DS}$ to generate a corrected reflectance value $R_C$. If the range $D_S$ falls between the ranges $D_1$ and $D_2$ corresponding to two adjacent entries $C_{D1}$ and $C_{D2}$ in the table, the correction factor $C_{DS}$ for that range $D_S$ may be estimated by interpolating between the correction factors $C_{D1}$ and $C_{D2}$.

The inventors have recognized and appreciated that LiDAR devices calibrated in accordance with such processes generally produce inaccurate measurements of reflectance because the use of interpolation to estimate correction factors for ranges that fall between the small number of ranges actually measured during the calibration process generally leads to inaccurate estimates of reflectance.

The present disclosure describes an improved technique for calibrating a LiDAR device to account for the effects of range on the intensity of a return signal, which is referred to herein as "reflectance over range calibration." A LiDAR device may be placed in proximity to a reflective target having an arcuate surface, such that the device's range to one end of the target is $D_{MIN}$ and the range to another end of the target is $D_{MAX}$. The device may perform a high-resolution scan of the target's arcuate surface, such that points on the arcuate surface at ranges between $D_{MIN}$ and $D_{MAX}$ are scanned with high resolution (e.g., at regular, short intervals). During the scan, the glancing angles of the transmitted optical signals with respect to the arcuate surface may be substantially uniform. Reflectance correction factors may then be calculated for the return signals and stored in a map (e.g., table) indexed by range, as described above. The correction factors in the map (or correction factors estimated by interpolating between the correction factors in the map) may then be used to generate corrected reflectance values, as described above. In some embodiments, the reflectance over range calibration may be performed twice—once using a reflective target having an arcuate surface with a reflectance value in the diffuse reflectance range (e.g., 50% diffuse reflectance), and once using a reflective target having an arcuate surface with a reflectance value in the retro-reflectance range (e.g., 50% retro-reflectance). The reflectance correction factors calculated using the diffuse reflective target may be stored in a first range-indexed map, and the reflectance correction factors calculated using the retro-reflective target may be stored in a second range-indexed map.

Particular embodiments of the improved reflectance over range calibration technique described herein can be implemented so as to realize one or more of the following advantages. LiDAR devices calibrated using the improved calibration technique may provide significantly more accurate reflectance measurements than devices calibrated using existing techniques, because the improved calibration map has significantly higher resolution than the existing calibration table, and therefore the error introduced by interpolating between adjacent entries in the improved calibration map is generally significantly smaller than the error introduced by interpolating between adjacent range entries in existing calibration tables.

Baseline Reflectance Calibration

Techniques for calibrating a LiDAR device to map the intensity levels of return signals to baseline reflectance levels may introduce inaccuracies into the LiDAR device's estimation of reflectance values for objects in the device's environment, particularly when the range from the LiDAR device to such an object is a range for which the LiDAR device's reflectance correction factor has a value less than 1. The inventors have recognized and appreciated that such inaccuracies can be reduced or eliminated by calibrating the LiDAR device to map the intensity levels of return signals reflected by a target to baseline reflectance levels in a reflectance range corresponding to the target's reflectance type (e.g., diffuse reflectance or retro-reflectance). For each reflectance type, the corresponding reflectance range may include a primary reflectance portion and an extended reflectance portion. For example, for diffuse reflective targets, the reflectance range may include a primary diffuse reflectance portion $R_{DIFF-PRI}$ (e.g., 0-100% diffuse reflectance) and an extended diffuse reflectance portion $R_{DIFF-EXT}$ (e.g., 100-800% diffuse reflectance). Likewise, for retro-reflective targets, the reflectance range may include a primary retro-reflectance portion $R_{RETRO-PRI}$ (e.g., 0-100% retro-reflectance) and an extended retro-reflectance portion $R_{RETRO-EXT}$ (e.g., 100-500% retro-reflectance).

Particular embodiments of the technique for calibrating LiDAR sensors in an extended reflectance range can be implemented so as to realize one or more of the following advantages. Relative to a LiDAR device calibrated using a baseline reflectance calibration process that is limited to baseline reflectance values within the diffuse reflectance range, a LiDAR device calibrated in accordance with an embodiment of the baseline reflectance calibration method disclosed herein may provide more accurate estimates of reflectance values for objects in the device's environment, particularly for objects at ranges for which the reflectance correction factor of the LiDAR device has a value less than 1 with diffuse or retro-reflective surfaces.

Reflectance Calibration Maps

Figure 3:
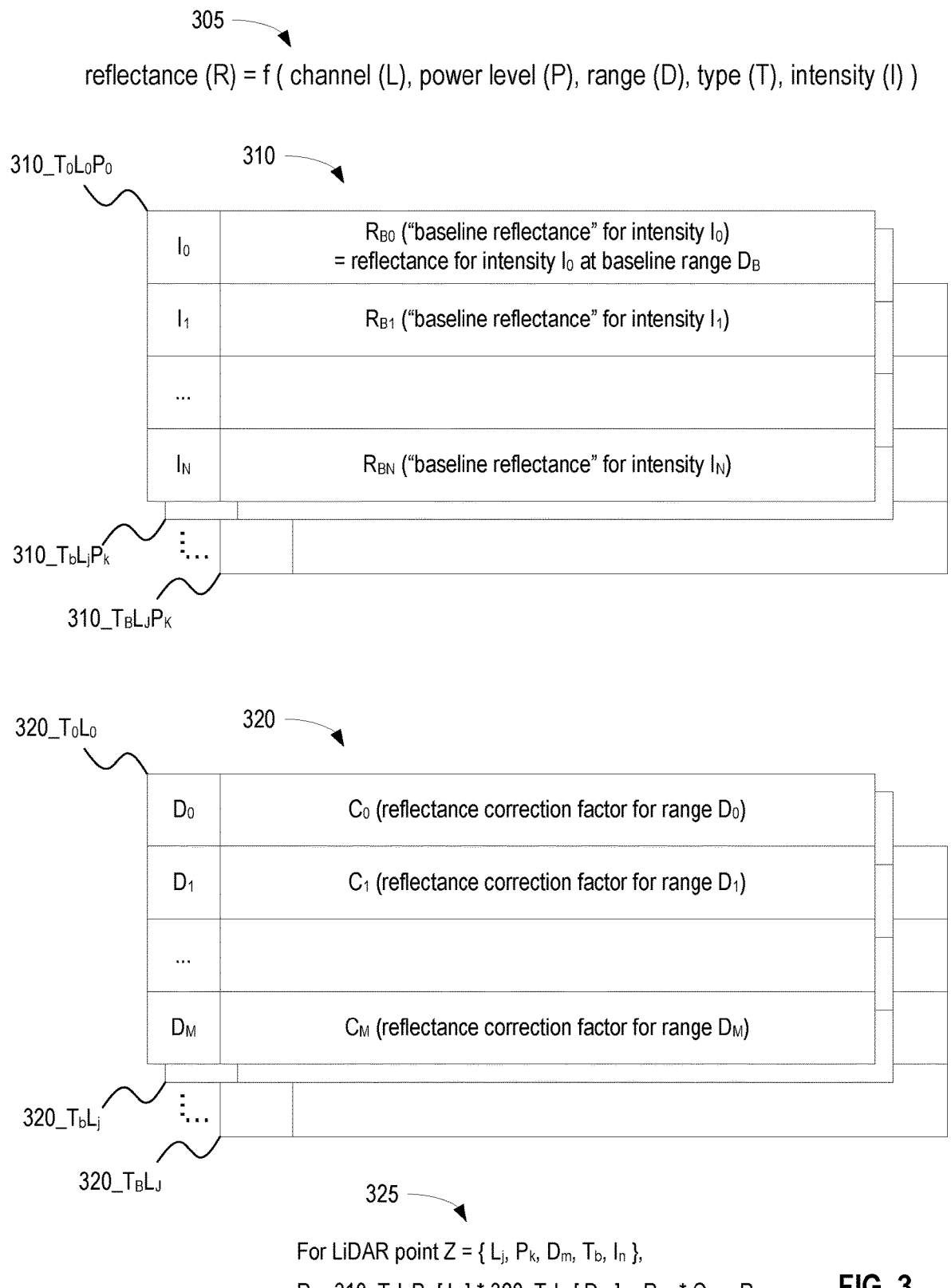
FIG. 3 shows examples of reflectance calibration maps for a LiDAR device, in accordance with some embodiments.

FIG. 3 shows a plurality of reflectance calibration maps (310, 320) for a LiDAR device, in accordance with some embodiments. In general, a "reflectance calibration map" can include any data structure and/or operator (e.g., mathematical function) that facilitates the determination (e.g., estimation) of the reflectance of a surface in the LiDAR device's environment based on data characterizing (1) a return signal reflected from the surface and/or (2) a channel of the LiDAR device that receives the return signal. As indicated by reflectance expression 305, the reflectance (R) of a surface that reflects a return signal ($S_R$) may be determined based on (e.g., be a function of) attributes of the channel (L) that emits an emitted light signal and receives the corresponding return signal, the power level (P) of the transmitter that emits the emitted light signal, the range (D) from the channel to the surface, the surface's reflectance type T (e.g., diffuse or retro), and the intensity (I) of the return signal at the receiver. Thus, in some embodiments, a reflectance calibration map may be indexed by one or more of a channel identifier (L), a transmitter power level (P), a range (D) to a surface, a reflectance type (T) of a surface, and/or an intensity (I) of a return signal, and may provide reflectance values or reflectance correction factors that correspond to the values of the map's index.

In some embodiments, a reflectance calibration map for a multi-channel LiDAR device is indexed by a 4-tuple {$L_j$, $P_k$, $T_b$, $I_n$}, where $L_j$ is the identifier of a channel that emits a light signal and receives the return signal, $P_k$ is the power level of the transceiver that emits the light signal, $T_b$ is the reflectance type of the surface that reflects the return signal, and $I_n$ is the measured intensity of the return signal. In response to a query specifying a valid index value {$L_j$, $P_k$, $T_b$, $I_n$}, the reflectance calibration map may provide a "baseline reflectance" value (RB) corresponding to the index value. Such a reflectance calibration map may be referred to herein as a "baseline reflectance map" 310. The baseline reflectance value ($R_B$) for an index value {$L_j$, $P_k$, $T_b$, $I_n$} may be the reflectance of a surface of reflectance type $T_b$ that reflects a return signal of intensity $I_n$ to the receiver of a channel $L_j$ in response to the channel generating an emitted light signal at power level $P_k$ when the range from the channel $L_j$ to the surface is a baseline range DB. Some embodiments of techniques for generating a baseline reflectance map 310 are described below with reference to FIGS. 5A-5E.

A baseline reflectance map 310 may be implemented using any suitable data structure including, without limitation, a lookup table or set of lookup tables. In the example of FIG. 3, the baseline reflectance map 310 for a multi-channel LiDAR device comprises a set of lookup tables 310_$T_0L_0P_0$-310_$T_BL_JP_K$, where the LiDAR device is calibrated for B types of reflective surfaces, the LiDAR device has J channels, each channel can operate its light transmitter at K distinct power levels, and the reference label 310_$L_jP_k$ refers to the baseline reflectance lookup table for the LiDAR device's j-th channel operating at its k-th power level. Each lookup table 310_$T_bL_jP_k$ is indexed by the intensity value of the return signal received by the channel and provides the baseline reflectance value ($R_B$) corresponding to the index intensity value (for a surface of reflectance type $T_b$, with the LiDAR device's j-th channel operating at its k-th power level).

If the intensity value of the return signal does not match any of the intensity index values of the corresponding lookup table, the baseline reflectance map 310 may determine the baseline reflectance value corresponding to the signal's intensity value based on the baseline reflectance value(s) for one or more intensity index values proximate to the signal's intensity value. For example, the baseline reflectance map 310 may return the baseline reflectance value corresponding to the intensity index value that is nearest the signal's intensity value, may interpolate or extrapolate based on the baseline reflectance values corresponding to the intensity index values that are proximate to (e.g., nearest) the signal's intensity value and return the interpolated or extrapolated value, etc. In embodiments in which the baseline reflectance map returns an interpolated baseline reflectance value $R_{BI}$ corresponding to a return signal intensity value $I_{SR}$ that falls between two adjacent intensity index values $I_n$ and $I_{n+1}$, the interpolated value $R_{BI}$ may be calculated as follows:

$$R_{BI} = 310\_T_bL_jP_k[I_n] + (310T_bL_jP_k[I_n] - 310\_T_bL_jP_k[I_{n+1}]) * (I_{SR} - I_n) / (I_{n+1} - I_n),$$

where 310_$T_bL_jP_k$ [$I_n$] represents the baseline reflectance value for a return signal of intensity $I_n$ (for a surface of reflectance type $T_b$, with the LiDAR device's channel j operating at power level k).

In some embodiments, a reflectance calibration map for a multi-channel LiDAR device is indexed by a 3-tuple {$T_b$, $L_j$, $D_m$}, wherein $T_b$ is the reflectance type of the surface that reflects the return signal, $L_j$ is the identifier of a channel and $D_m$ is the measured range from the channel $L_j$ to the surface that reflects the return signal. In response to a query specifying a valid index value {$T_b$, $L_j$, $D_m$}, the reflectance calibration map may provide a "reflectance correction factor" ($C_m$) corresponding to the index value. Such a reflectance calibration map may be referred to herein as a "reflectance correction factor map" 320. The reflectance correction factor ($C_m$) for an index {$T_b$, $L_j$, $D_m$} may be a value that can be combined with a baseline reflectance value ($R_B$) of a surface to determine (e.g., estimate) the reflectance R of the surface when the range from the channel $L_j$ to the surface of reflectance type $T_b$ is $D_m$. Some embodiments of techniques for generating a reflectance correction factor map 320 are described below with reference to FIGS. 4A-4E.

A reflectance correction factor map 320 may be implemented using any suitable data structure including, without limitation, a lookup table or set of lookup tables. In the example of FIG. 3, the reflectance correction factor map 320 for a multi-channel LiDAR device comprises a set of lookup tables 320_$T_0L_0$-320_$T_BL_J$, where the LiDAR device has J channels and the reference label 310_$T_bL_j$ refers to the reflectance correction factor lookup table for the LiDAR device's j-th channel and for a surface of reflectance type $T_b$. Each lookup table 310_$T_bL_j$ is indexed by the range D from the channel $L_j$ to the surface of interest, and provides the reflectance correction factor (C) corresponding to the index range value D.

If the range $D_S$ from the channel to the surface does not match any of the range index values of the corresponding lookup table, the reflectance correction factor map 320 may determine the reflectance correction factor corresponding to the range $D_S$ based on the reflectance correction factor(s) for one or more range index values proximate to the range value $D_S$. For example, the reflectance correction factor map 320 may return the reflectance correction factor C corresponding to the range index value that is nearest the range value $D_S$, may interpolate or extrapolate based on the reflectance correction factors corresponding to the range index values that are proximate to (e.g., nearest) the range value $D_S$ and return the interpolated or extrapolated value, etc. In embodiments in which the reflectance correction factor map returns an interpolated correction factor $C_I$ corresponding to a range value $D_S$ that falls between two adjacent range index values $D_m$ and $D_{m+1}$, the interpolated value $C_I$ may be calculated as follows:

$$C_I = 320\_T_b L_j[D_m] + (320\_T_b L_j[D_m] - 320\_T_b L_j[D_{m+1}]) * (D_S - D_m)/(D_{m+1} - D_m),$$

where $320\_T_b L_j[D_m]$ represents the reflectance correction factor for a surface at range $D_m$ (for channel j and for a surface of reflectance type $T_b$).

A LiDAR device may use its baseline reflectance map 310 and reflectance correction factor map 320 to determine (e.g., estimate) the reflectance R associated with a LiDAR point $Z = \{L_j, P_k, D_m, T_b, I_n\}$, where $L_j$ is the identifier of a channel that emits a light signal and receives the return signal, $P_k$ is the power level of the transceiver that emits the light signal, $D_m$ is the range from the surface that reflects the return signal to the LiDAR device (or to its channel $L_j$), $T_b$ is the reflectance type of the surface, and $I_n$ is the measured intensity of the return signal. For example, the LiDAR device may determine the reflectance R associated with LiDAR point Z using reflectance calibration expression 325:

$$R = 310\_T_b L_j P_k[I_n] * 320\_T_b L_j[D_m] = R_{Bn} * C_m = R_{mn},$$

where $310\_T_b L_j P_k[I_n]$ is the baseline reflectance $R_{Bn}$ associated with a return signal of intensity $I_n$ at channel $L_j$ when the corresponding emitted light signal is transmitted at power level $P_k$ and reflected by a surface of reflectance type $T_b$, $320\_T_b L_j[D_m]$ is the reflectance correction factor $C_m$ for points at range $D_m$ from the channel $L_j$ on a surface of reflectance type $T_b$, and the product of the baseline reflectance $R_{Bn}$ and the reflectance correction factor $C_m$ is the reflectance $R = R_{mn}$ of the surface of reflectance type $T_b$ (at range $D_m$) that reflected the return signal (having intensity $I_n$) at the point of reflection. One of ordinary skill in the art will appreciate that the LiDAR device may query its baseline reflectance map 310 and reflectance correction factor map 320 for the baseline reflectance $R_{Bn}$ and the reflectance correction factor $C_m$ corresponding to a point Z serially or in parallel.

Generating different sets of reflectance calibration maps for reflective surfaces of different reflectance types may enhance the accuracy of a LiDAR device's estimates of reflectance values for surfaces in the device's environment. Even where the ranges of reflectance values for two types of reflective surfaces are adjacent (e.g., the diffuse reflectance range for diffuse reflective targets is adjacent to the retro-reflectance range for retro-reflective targets), the reflectance expressions 305 for the two types of surfaces may differ significantly. Thus, when a LiDAR device uses a channel $L_j$ operating at a power level $P_k$ to transmit a signal at a target at a range $D_m$ from the LiDAR device, the baseline reflectance $R_{Bn}$ and the reflectance correction factor $C_m$ yielding an accurate estimate of the target's reflectance are likely to differ depending on the target's reflectance type, and the correct $R_{Bn}$ and $C_m$ values for one type of reflective surface are often difficult to extrapolate based on the $R_{Bn}$ and $C_m$ values for another type of reflective surface. Thus, the accuracy of the LiDAR device's estimates of reflectance values may be enhanced by calibrating the device separately for different types of reflective surfaces.

Reflectance Over Range Calibration

Figure 4A:
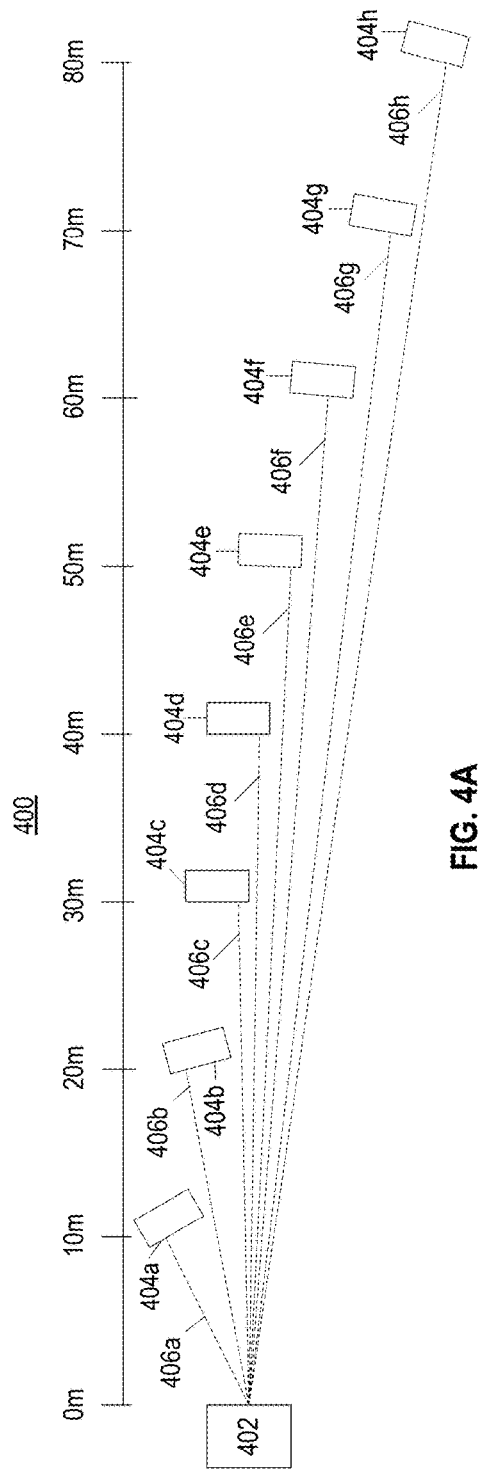
FIG. 4A shows an example of a calibration environment for performing reflectance over range calibration of a LiDAR device.

FIG. 4A shows an example of a calibration environment 400 for performing reflectance over range calibration (e.g., low-resolution reflectance over range calibration) of a LiDAR device. The calibration environment 400 includes a LiDAR device 402 (the device being calibrated) and a plurality of reflective panels 404a-404h. In the example of FIG. 4A, eight reflective panels 404 are arranged at 10 meter intervals, with the nearest reflective panel 404a positioned 10 m from the LiDAR device 402, the next reflective panel 404b positioned 20 m from the LiDAR device 402, and so on. Other configurations of the calibration environment 400 are possible. For example, the calibration environment 400 may include fewer than 8 or more than 8 reflective panels, which may be arranged at regular or irregular intervals.

The surfaces of the reflective panels 404 may be highly Lambertian, in the sense that the panel surfaces may function as nearly ideal diffuse reflectors. The diffuse reflectance values of the panels' surfaces may be design parameters of the surface materials and may be specified by the surface material's supplier. For example, the surface of a panel 404 may comprise a Zenith Polymer® Diffuser provided by SphereOptics or a Permaflect® Durable Diffuse Reflectance Coating provided by Labsphere, with nearly ideal Lambertian properties and a reference reflectance (e.g., nominal diffuse reflectance) of approximately 95%, 90%, 50%, 20%, or 5% diffuse reflectance, subject to a manufacturing tolerance of +/−3%. Alternatively, other highly Lambertian materials may be used.

Within calibration environment 400, a process for performing reflectance over range calibration (e.g., low-resolution reflectance over range calibration) of the LiDAR device 402 may involve the following steps. Each channel of the LiDAR device 402 may be controlled to emit light signals toward reflection points on the surfaces of the reflective panels 404 and to receive return signals 406a-406h reflected from the reflection points. For a given return signal S received at a channel L of the LiDAR device:

the range (D) from the LiDAR device 402 to the return signal's reflection point may be determined (e.g., based on stored environmental data $E_1$ indicating the positions of the reflective panels 404 in the calibration environment 400 relative to the position of the LiDAR device 402, or based on the LiDAR device's analysis of the total time of flight of the return signal S and the corresponding emitted light signal);

the baseline reflectance ($R_B$) of the return signal's reflection point may be determined (e.g., based on data obtained from a baseline reflectance map 310 of the LiDAR device 402);

the reference reflectance ($R_R$) of the return signal's reflection point may be determined (e.g., based on stored environmental data $E_2$ indicating the reference reflectance values of the surfaces of the reflective panels 404 at the return signals' glancing angles);

a reflectance correction factor (C) corresponding to the channel L and the range D may be determined based on the baseline reflectance ($R_B$) and the reference reflectance ($R_R$) (e.g., the correction factor C may be calculated as $C=R_R/R_B$); and the reflectance correction factor (C) may be stored in the reflectance correction factor map 320 for the LiDAR device 402, in an entry corresponding to channel L and range D. The above-described calibration process may be performed for each of the return signals S.

The above-described calibration process may be performed by a calibration module, which may control the LiDAR device 402 to emit light signals and receive return signals in accordance with the above-described process, perform the above-described data analysis steps (e.g., determine the range D, baseline reflectance $R_B$, reference reflectance $R_R$, and reflectance correction factor C corresponding to each of the return signals S), and store the reflectance correction factors C in the reflectance correction map 320 for the LiDAR device 402. Portions of the calibration module may be part of the LiDAR device 402 (e.g., instructions resident in a computer-readable storage medium within the LiDAR device and executed by a processor within the LiDAR device) and/or external to the LiDAR device 402.

During the above-described calibration process, channels of the LiDAR device 402 may be controlled to emit light signals toward reflection points on the surfaces of the reflective panels 404 using any suitable technique. For example, the calibration module may use the environmental data $E_1$ to determine the azimuths (horizontal) from the LiDAR device 402 to the reflective panels 404, and may control each of the channels 102 of the LiDAR device 402 to emit light signals along each of those azimuths. In some embodiments, the calibration module may perform this task by instructing each channel's control and data acquisition module 108 to control the channel 102 to emit light signals along the specified azimuths, and the control and data acquisition module may configure the channel's oscillating mirror 256 to direct light signals emitted by the channel along the specified azimuths toward the surfaces of the reflective panels 404. In some cases, multiple (e.g., all) channels of the LiDAR device 402 may emit light signals toward the surface of a particular reflective panel 404 in parallel.

The above-mentioned stored environmental data $E_1$ (which indicate the positions of the reflective panels 404 in the calibration environment 400 relative to the position of the LiDAR device 402) and/or $E_2$ (which indicate the reference reflectance values of the surfaces of the reflective panels 404) may be obtained using any suitable technique. In some cases, an operator or administrator of the calibration environment 400 may generate the environmental data $E_1$ based on the positions of the reflective panels 404 and a position in the calibration environment designated for placement of the LiDAR device being calibrated. Likewise, an operator or administrator of the calibration environment 400 may generate the environmental data $E_2$ based on measurements of the reflectance values of the surfaces of the reflective panels 404. Such measurements may be obtained, for example, using an already-calibrated LiDAR device or using any other suitable technique. Alternatively, the environmental data $E_2$ may be derived from the design specifications of the materials used on the surfaces of the reflective panels, which may be provided by the suppliers of the materials. The environmental data $E_1$ and/or $E_2$ may be stored in a computer-readable storage medium accessible to the calibration module (e.g., via a communication network), and the calibration module may load or retrieve the environmental data using any suitable technique.

An example of a process for performing reflectance over range calibration in connection with a calibration environment 400 has been described. An example of a calibration environment 400 has also been described, in which the surfaces of the reflective panels 404 are highly Lambertian. In connection with this embodiment of the calibration environment 400, performing the above-described reflectance over range calibration process may produce a reflectance correction factor map 320 suitable for performing reflectance over range correction on signals reflected by targets with diffuse reflective surfaces. In some embodiments of the calibration environment 400, the surfaces of the reflective panels 404 may be retro-reflective, with reference reflectance values (e.g., nominal retro-reflectance) between approximately 1-100% retro-reflectance (e.g., 50% retro-reflectance). Some examples of suitable retro-reflective panels are described below. In connection with such embodiments of the calibration environment 400, performing the above-described reflectance over range calibration process may produce a reflectance correction factor map 320 suitable for performing reflectance over range correction on signals reflected by targets with retro-reflective surfaces. In some cases, the calibration process may be performed in a calibration environment 400 having highly Lambertian reflective panels, and performed again in a calibration environment 400 having retro-reflective panels, thereby generating distinct reflectance correction factor maps 320, each being suitable for the corresponding type of reflective surface.

Figure 4B:
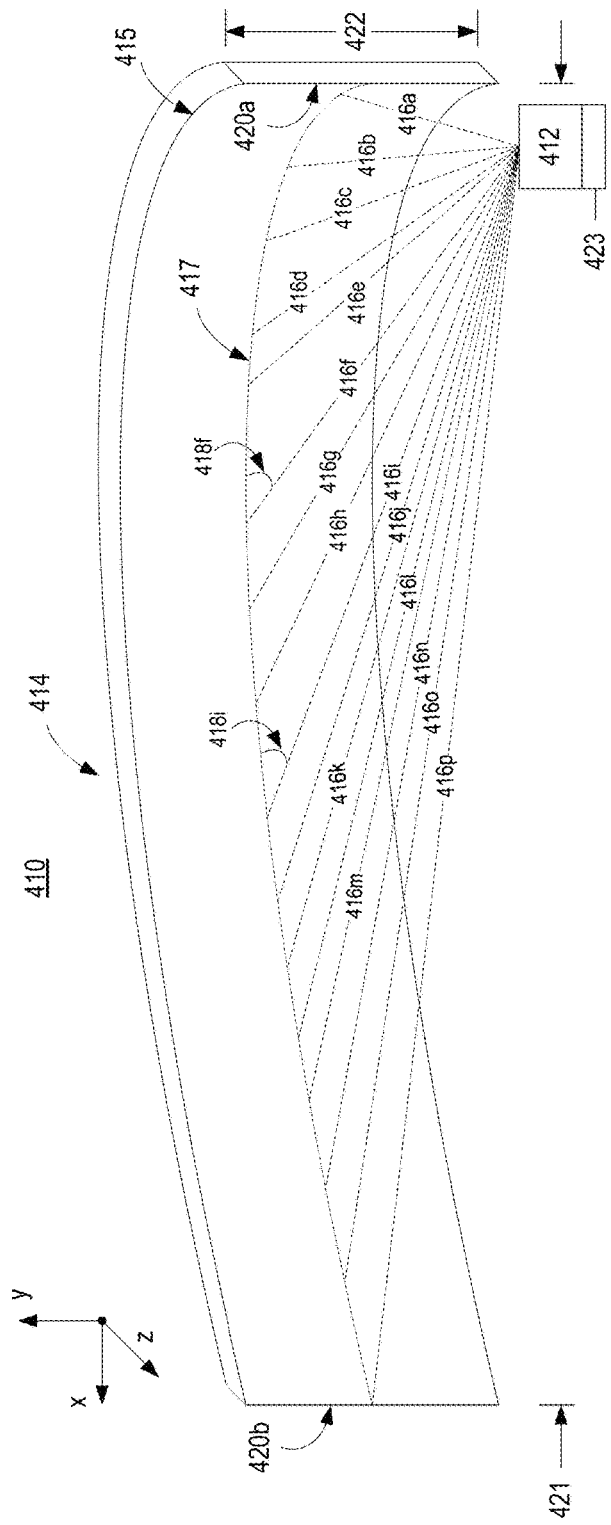
FIG. 4B shows a calibration environment for performing reflectance over range calibration of a LiDAR device, in accordance with some embodiments.

FIG. 4B shows a calibration environment 410 for performing reflectance over range calibration (e.g., high-resolution reflectance over range calibration) of a LiDAR device 412, in accordance with some embodiments. In some embodiments, the calibration environment 410 includes a LiDAR device 412 (the device being calibrated) and a reflective target 414 ("arcuate reflective target") that has an arcuate surface 415. In some embodiments, the width 421 of the arcuate reflective target is 50-150 m (e.g., 80 m). In some embodiments, the LiDAR device 412 is disposed proximate to a near end 420a of the arcuate reflective target 414. The minimum range ($D_{MIN}$) from the LiDAR device 412 to the arcuate surface 415 near the first end 420a of the reflective target 414 may be 0.2-5.0 m (e.g., 2 m). The maximum range ($D_{MAX}$) from the LiDAR device 412 to the arcuate surface 415 near a second end 420b of the reflective target 414 may be 50-150 m (e.g., 80 m). Thus, the calibration environment 410 may be suitable for performing reflectance over range calibration of the LiDAR device 412 over a range of 0.2-150 m (e.g., 2-80 m).

The arcuate surface 415 of the reflective target 414 may be highly Lambertian, in the sense that the surface 415 may function as a nearly ideal diffuse reflector. In some embodiments, the reflectance value of the arcuate surface 415 is substantially uniform across the entire arcuate surface. For example, the arcuate surface 415 may comprise one or more Zenith Polymer® Diffusers, each exhibiting nearly ideal Lambertian properties and a common reference reflectance (e.g., nominal diffuse reflectance) of approximately 95%, 90%, 50%, 20%, or 5% diffuse reflectance, subject to a manufacturing tolerance of +/−3%. Alternatively, other highly Lambertian materials may be used.

Figure 4C:
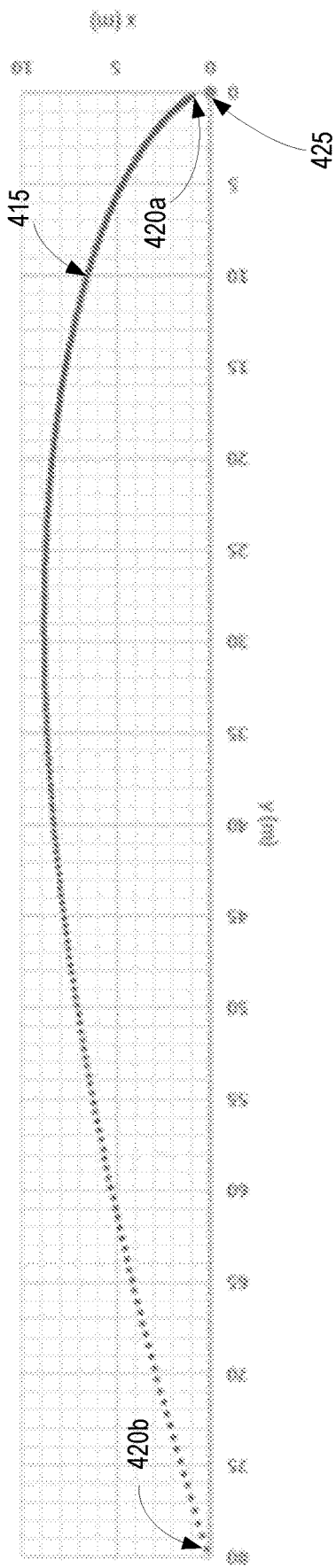
FIG. 4C shows a profile view of an arcuate surface of a reflective target, in accordance with some embodiments.

As described in further detail below with reference to FIG. 4E, during the calibration process, the LiDAR device 412 may perform a high-resolution scan of the arcuate surface 415, such that points on the arcuate surface 415 at ranges between $D_{MIN}$ and $D_{MAX}$ are scanned with high resolution. The arcuate surface 415 may be shaped such that during the scan, the glancing angles 418 of the return signals 416 with respect to the arcuate surface 415 are substantially uniform. Referring to FIG. 4C, a profile view of an embodiment of a suitably shaped arcuate surface 415 is shown. In the example of FIG. 4C, the arcuate surface 415 has a width of 80 m and a maximum depth of approximately 9 m, and the LiDAR device 412 is placed at location 425 during calibration. The dimensions and shape of the arcuate surface 415 in FIG. 4C, including the units shown on the horizontal and vertical axes, are shown by way of example and are not limiting. Referring again to FIG. 4B, during the calibration process, reflectance correction factors C may be calculated for the return signals 416, and these correction factors C may be stored in a reflectance correction factor map 320, wherein they may be indexed by the channels and ranges to which they apply.

In some embodiments, during the high-resolution scan of the arcuate surface 415, a set of two or more (e.g., all) channels of the LiDAR device 412 may scan the arcuate surface simultaneously. Together, this set of channels may have a vertical field of view (FOV) of, for example, 30-120 degrees. In some embodiments, during calibration, the channels may scan the target 414 in a direction parallel to the LiDAR device's vertical FOV. For example, the LiDAR device 412 may be oriented with its vertical FOV approximately parallel to the width 421 of the reflective target 414 (e.g., in the x-direction in FIG. 4B), and the device's channels may simultaneously scan the reflective target 414 in a single track 417 along the target's width 421 (e.g., in the x-direction in FIG. 4B). One advantage of this approach is that the device's channels (even the channels at the top and bottom of the device's vertical FOV) may continue to point at the reflective target 414 as the range from the LiDAR device 412 to the reflective target 414 increases, throughout the full range of the scan, even if the height 422 of the reflective target is quite low. However, most LiDAR devices are not capable of independently reorienting themselves or their channels in a direction parallel to the device's vertical FOV. Thus, to effectuate this type of scan, a calibration device 423 may hold the LiDAR device in the orientation with its vertical FOV approximately parallel to the width 421 of the reflective target, and may rotate the LiDAR device around an axis orthogonal to the device's vertical FOV and parallel to the reflective target's height (e.g., the y-axis in FIG. 4B), such that the channels scan the target 414 in a single track 417.

The calibration device 423 may include, for example, a processor, a computer-readable storage medium (e.g., memory), and a robot arm. The memory may store a calibration program which, when executed by the processor, controls the robot arm to hold and rotate the LiDAR device 412 as described above, and communicates with the LiDAR device to perform the steps of a calibration method (e.g., calibration method 450 as described below).

Alternatively, during calibration, the channels may scan the target 414 in a direction orthogonal to the LiDAR device's vertical FOV. For example, the LiDAR device 412 may be oriented with its vertical FOV approximately parallel to the height 422 of the reflective target 414 (e.g., in the y-direction in FIG. 4B), and the device's channels may simultaneously scan the reflective target 414 in vertically spaced tracks along the target's width 421 (e.g., in the x-direction in FIG. 4B). One advantage of this approach is that many LiDAR devices are capable of controlling their channels' oscillating mirrors 256 to independently perform this type of scan. However, with this approach, it may be difficult to efficiently calibrate more than a few channels of the LiDAR device 412 at the same time, because channels at the top and bottom of the device's vertical FOV may not continue to point at the reflective target 414 as the range from the LiDAR device 412 to scanned portion of the reflective target 414 increases. This difficulty can be ameliorated by using a reflective target 414 with height 422 sufficient to ensure that the vertical FOV of the device 412 does not extend above or below the arcuate surface 415 during the scan, such that all the light signals emitted by the set of channels during the scan are directed toward (e.g., incident on) the arcuate surface 415. However, a reflective target with a height 422 suitable for such a scan may be expensive to produce and difficult to maintain.

When the alternative calibration process is used, channels of the LiDAR device 412 may be controlled to emit light signals toward reflection points on the arcuate surface 415 of the reflective target 414 using any suitable technique. For example, a calibration module may determine the azimuths (horizontal) from the channels of the LiDAR device 412 to the corresponding reflection points, and may control the channels 102 of the LiDAR device 412 to emit light signals along those azimuths. In some embodiments, the calibration module may perform this task by instructing each channel's control and data acquisition module 108 to control the channel 102 to emit light signals along the specified azimuths, and the control and data acquisition module 108 may configure the channel's oscillating mirror 256 to direct light signals emitted by the channel along the specified azimuths toward the reflection points on the arcuate surface 415 of the reflective target 414. Alternatively, the calibration module may direct each channel's control and data acquisition module 108 to perform a sweep such that light signals are emitted when the channel's oscillating mirror is in each of a set of finite and discrete orientations. In this way, the distribution of the reflection points on the arcuate surface 415 of the reflective target 414 may be determined by the selected orientations of the oscillating mirror, rather than the orientations of the oscillating mirror being determined based on selected locations of the reflection points.

Figure 4D:
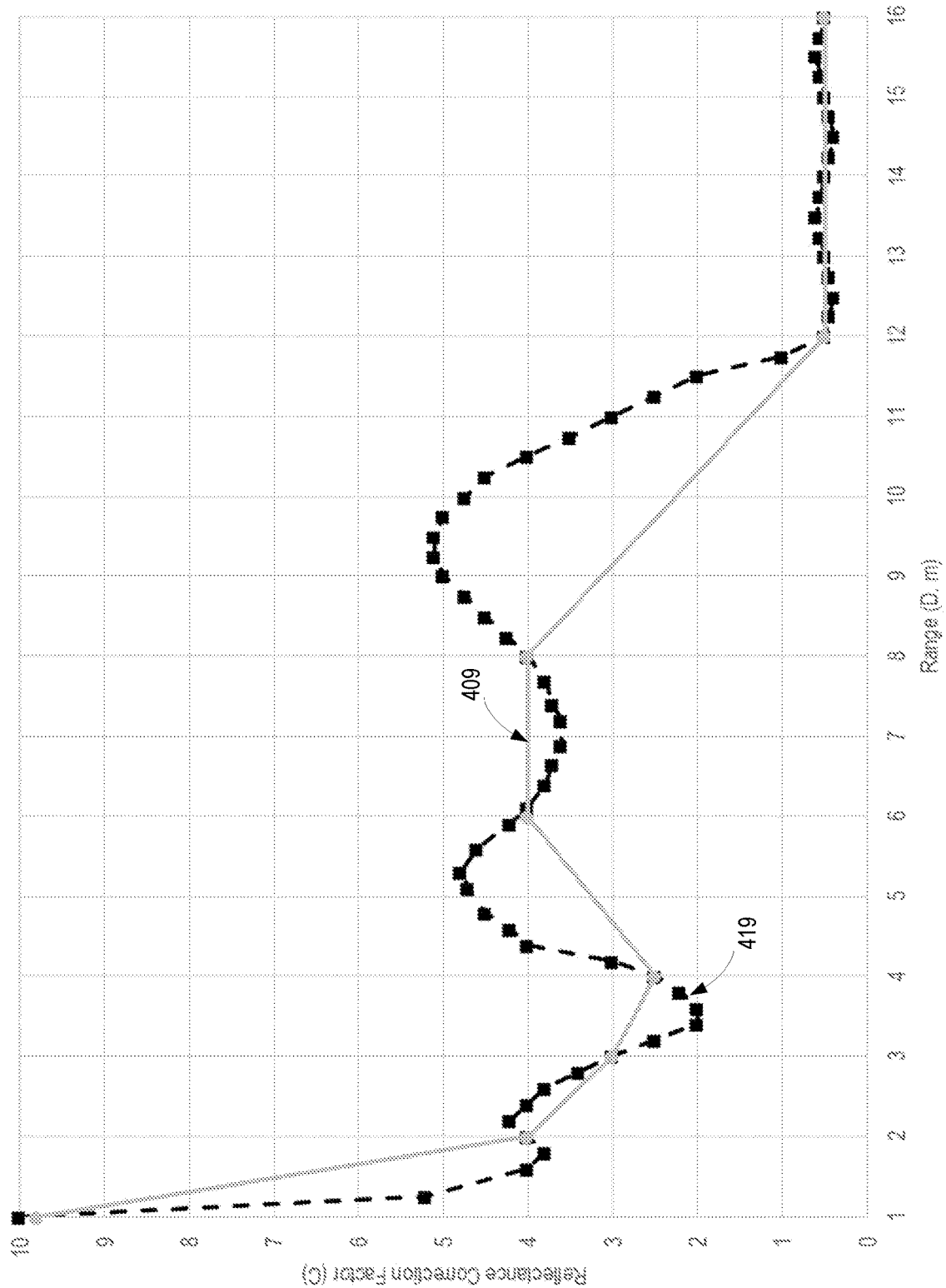
FIG. 4D shows scatter plots of reflectance correction factors obtained from different calibration environments.
Figure 4E:
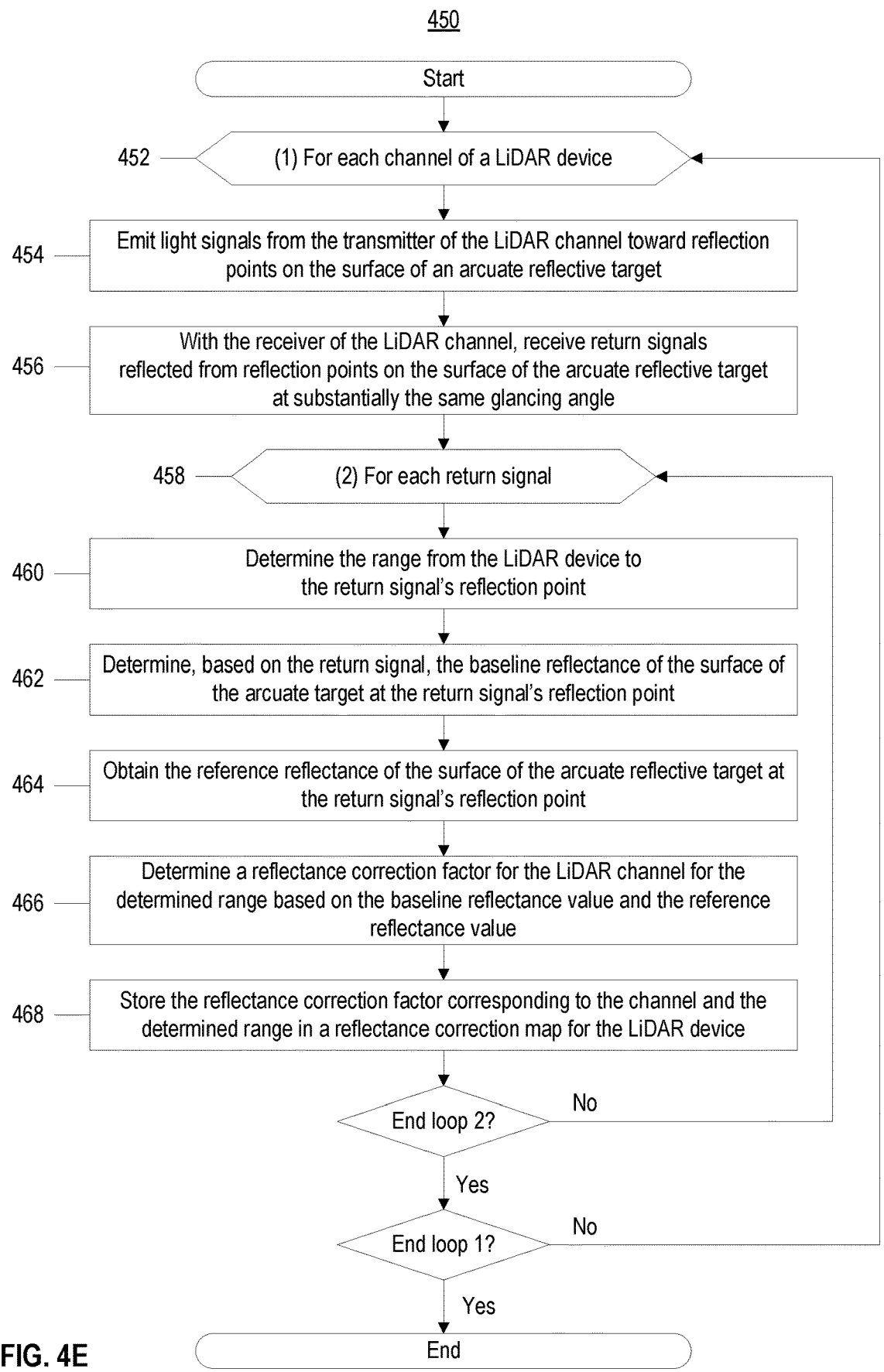
FIG. 4E shows a flowchart of method for performing reflectance over range calibration of a LiDAR device, in accordance with some embodiments.

Referring to FIG. 4E, an embodiment of a method 450 for performing reflectance over range calibration (e.g., high-resolution reflectance over range calibration) of a LiDAR device is shown. The calibration method 450 may be suitable for performing reflectance over range calibration of a LiDAR device 412 in a calibration environment 410. As indicated by the loop header 452, steps 454 and 456 of the method 450 may be performed for each channel of the LiDAR device 412. Likewise, as indicated by the loop header 458, steps 460-468 of the method 450 may be performed for each return signal received by the LiDAR device 412 during the calibration process. For simplicity, the following paragraphs describe steps 454 and 456 with reference to a single channel of the LiDAR device 412, and describe steps 460-468 with reference to a single return signal received by a single channel of the LiDAR device. However, one of ordinary skill in the art will appreciate that steps 454 and 456 each may be performed in parallel by two or more (e.g., all) channels of the LiDAR device 412. Likewise, one of ordinary skill in the art will appreciate that the set of steps 460-468 may be performed in parallel (1) by a single channel of the LiDAR device 412 with respect to two or more return signals received by the channel, and/or (2) by two or more (e.g., all) channels of the LiDAR device 412 with respect to return signals received by the respective channels.

In step 454, the transmitter of a channel L of the LiDAR device 412 may emit light signals toward a set of reflection points on an arcuate surface 415 of a reflective target 414. The quantity and spatial distribution of the reflection points on the arcuate surface 415 may be determined, for example, by the calibration device 423 that controls the operation of the LiDAR device 412 during the calibration process. In some embodiments, the set of ranges from the LiDAR device 412 to the set of reflection points may represent a high-resolution sample of the spectrum of ranges between the minimum range ($D_{MIN}$) from the LiDAR device 412 to the arcuate surface 415 and the maximum range ($D_{MAX}$) from the LiDAR device 412 to the arcuate surface 415. For example, the reflection points may be distributed such that the emitted signals sample the 'range spectrum' [$D_{MIN}$-$D_{MAX}$] at intervals of 0.01-2 m (e.g., regular intervals of 0.25 m). The reflection points may be distributed such that the emitted signals sample the range spectrum at regular or irregular intervals. In the case of irregular intervals, the reflection points may be clustered more tightly on the portions of the arcuate surface nearest to the LiDAR device and less tightly on the portions of the arcuate surface furthest from the LiDAR device, such that the emitted signals sample the lower end of the range spectrum at higher resolution and sample the higher end of the range spectrum at lower resolution.

In step 456, the receiver of the channel L receives return signals reflected from the set of reflection points. The glancing angles 418 of the channel's return signals 416 with respect to the arcuate surface 415 of the reflective target 414 may be substantially the same. Likewise, the horizontal glancing angles 418 of the channel L's return signals 416 with respect to the arcuate surface 415 of the reflective target 418 may be substantially the same as the horizontal glancing angles of the other channels' return signals.

With respect to each of the return signals received by the channel, in step 460, the range (D) from the LiDAR device 412 to the return signal's reflection point may be determined (e.g., based on the LiDAR device's analysis of the total time of flight of the return signal S and the corresponding emitted light signal). In step 462, the baseline reflectance ($R_B$) of the return signal's reflection point may be determined (e.g., based on data obtained from a baseline reflectance map 310 of the LiDAR device 412). In step 464, the reference reflectance ($R_R$) of the return signal's reflection point may be determined (e.g., based on stored environmental data E indicating the equivalent reference reflectance value of the arcuate surface 415 of the reflective target 414 at the return signal's glancing angle, or the equivalent reference reflectance values of respective portions of the arcuate surface 415 at the return signal's glancing angle). In step 466, a reflectance correction factor (C) corresponding to the channel L and the range D may be determined based on the baseline reflectance ($R_B$) and the reference reflectance ($R_R$) (e.g., the correction factor C may be calculated as $C=R_R/R_B$). In step 468, the reflectance correction factor (C) may be stored in the reflectance correction map 320 for the LiDAR device 412, in an entry corresponding to channel L and range D.

The calibration method 450 may be performed by the calibration device 423, which may control the LiDAR device 412 to emit light signals in step 454, receive return signals in step 456, and determine the ranges corresponding to the return signals in step 460; may perform the data analysis tasks associated with steps 462-466 (e.g., determining the baseline reflectance $R_B$, reference reflectance $R_R$, and reflectance correction factor C corresponding to each of the return signals); and may store the reflectance correction factors C in the device's reflectance correction map 320. In some embodiments, the calibration device 423 may communicate with a calibration module within the LiDAR device 412 (e.g., a program resident in a computer-readable storage medium within the LiDAR device and executed by a processor within the LiDAR device) and/or with the control and data acquisition modules 108 of the LiDAR device's channels to control the LiDAR device to perform steps 454, 456, and 460 as described above.

The above-mentioned stored environmental data E, which indicate the reference reflectance value(s) of the arcuate surface of the reflective target 414, may be obtained using any suitable technique. In some cases, an operator or administrator of the calibration environment 410 may generate the environmental data E based on measurements of the reflectance values of the arcuate surface 415 of the reflective target 414. Such measurements may be obtained, for example, using an already-calibrated LiDAR device or using any other suitable technique. Alternatively, the environmental data E may be derived from the design specifications of the materials used on the arcuate surface 415 of the reflective target 414, which may be provided by the suppliers of the materials. The environmental data E may be stored in a computer-readable storage medium within the calibration device 423 or accessible to the calibration device 423 (e.g., via a communication network), and the calibration device 423 may load or retrieve the environmental data using any suitable technique.

FIG. 4D shows scatter plots of reflectance correction factors determined using the calibration environment 400 (with highly Lambertian reflective panels 404) and the calibration environment 410 (with a highly Lambertian arcuate surface 415). In the example of FIG. 4D, the points of scatter plot 409 represent reflectance correction factors calculated during a low-resolution calibration process in a low-resolution calibration environment 400, and the line segments connecting the points of the scatter plot 409 represent intermediate reflectance correction factors determined by interpolating between the calculated reflectance correction factors. Likewise, the points of scatter plot 419 represent reflectance correction factors calculated using an embodiment of a high-resolution calibration method 450 in an embodiment of a high-resolution calibration environment 410, and the line segments connecting the points of the scatter plot 419 represent intermediate reflectance correction factors determined by interpolating between the calculated reflectance correction factors.

In the example of FIG. 4D, the reflectance correction factors obtained using the high-resolution calibration method 450 (represented by scatter plot 419) are significantly more accurate than the reflectance correction factors obtained using a low-resolution calibration process (represented by scatter plot 409), particularly for ranges in which (1) the reflectance correction factors corresponding to the low-resolution calibration process are determined by interpolation, and (2) the reflectance correction factor varies greatly as the range changes (e.g., ranges of 1-2 m, 4-6 m, 6-8 m, and 8-12 m). The enhanced accuracy of the high-resolution reflectance correction factors within these ranges may arise from the high-resolution scanning process used in the calibration method 450. One of ordinary skill in the art will appreciate that the spike in the reflectance correction factor at ranges between 4 and 12 m may occur because the LiDAR device's channels use different lenses to receive short-range return signals and longer-range return signals, and the lenses are swapped at a range of 4-12 m (e.g., 8 m). Thus, the reflectance correction factors obtained using the high-resolution calibration method 450 may be significantly more accurate than the reflectance correction factors obtained using a low-resolution calibration process for segments of the range spectrum in which the LiDAR receivers swap their lenses.

An example has been described in which a data collection phase of the high-resolution calibration method 450 (e.g., steps 454, 456, and 460) is integrated with the method's correction determination phase (e.g., steps 464-468). In some embodiments, the data collection phase of the high-resolution calibration method 450 for a LiDAR device 412 may be performed in its entirety, and then the correction determination phase of the calibration method 450 for the LiDAR device 412 may be performed. In such embodiments, step 462 may be part of the data collection phase (e.g., the LiDAR device may determine the baseline reflectance value corresponding to each return signal's reflectance point) and/or part of the correction determination phase (e.g., the LiDAR device may measure the intensity values and/or other properties of the return signals during the data collection phase, and the calibration device 423 may use those measurements to determine the baseline reflectance values corresponding to the return signals' reflectance points during the correction determination phase).

An example of a high-resolution reflectance over range calibration method 450 suitable for use in connection with a calibration environment 410 has been described. An example of a calibration environment 410 has also been described, in which the arcuate surface 415 of a reflective target 414 is highly Lambertian. In connection with this embodiment of the calibration environment 410, performing the high-resolution reflectance over range calibration method 450 may produce a reflectance correction factor map 320 suitable for performing reflectance over range correction on signals reflected by targets with diffuse reflective surfaces. In some embodiments of the calibration environment 410, the arcuate surface 415 of the reflective target 414 is retro-reflective, with a reference reflectance value (e.g., nominal retro-reflectance) between approximately 1-100% (e.g., 50%) retro-reflectance. Some examples of suitable retro-reflective panels are described below. In connection with such embodiments of the calibration environment 410, performing the high-resolution reflectance over range calibration method 450 may produce a reflectance correction factor map 320 suitable for performing reflectance over range correction on signals reflected by targets with retro-reflective surfaces. In some cases, the calibration method 450 may be performed in a calibration environment 410 in which the arcuate surface 415 of the reflective target is highly Lambertian, and the calibration method 450 may be performed again in a calibration environment 410 in which the arcuate surface 415 of the reflective target is retro-reflective, thereby generating distinct reflectance correction factor maps 320, each being suitable for the corresponding type of reflective surface.

In some embodiments of the calibration environment 410 with the retro-reflective arcuate surface 415, the LiDAR device 412 and the calibration device 423 may be positioned relative to the reflective target 414 such that the glancing angle 418 of the return signals with respect to the arcuate surface 415 is always greater than a minimum value $GA_{MIN}$. Retro-reflective materials generally do not exhibit retro-reflective properties in connection with return signals having glancing angles below a minimum value $GA_{MIN}$, which may vary depending on the material and other parameters. In some embodiments, the minimum glancing angle $GA_{MIN}$ used in the calibration environment 410 with the retro-reflective arcuate surface 415 is between 10 degrees and 45 degrees (e.g., between 15 degrees and 40 degrees).

In some embodiments of the calibration environment 410 with the retro-reflective arcuate surface 415, the minimum range ($D_{MIN}$) from the LiDAR device 412 to the arcuate surface 415 near the first end 420a of the reflective target 414 may be 5 m-15 m (e.g., 10 m). The maximum range ($D_{MAX}$) from the LiDAR device 412 to the arcuate surface 415 near a second end 420b of the reflective target 414 may be 50-150 m (e.g., 80 m). Thus, the calibration environment 410 with the retro-reflective arcuate surface 415 may be suitable for performing reflectance over range calibration of the LiDAR device 412 over a range of 5-150 m (e.g., 5-80 m).

Baseline Reflectance Calibration

Figure 5B:
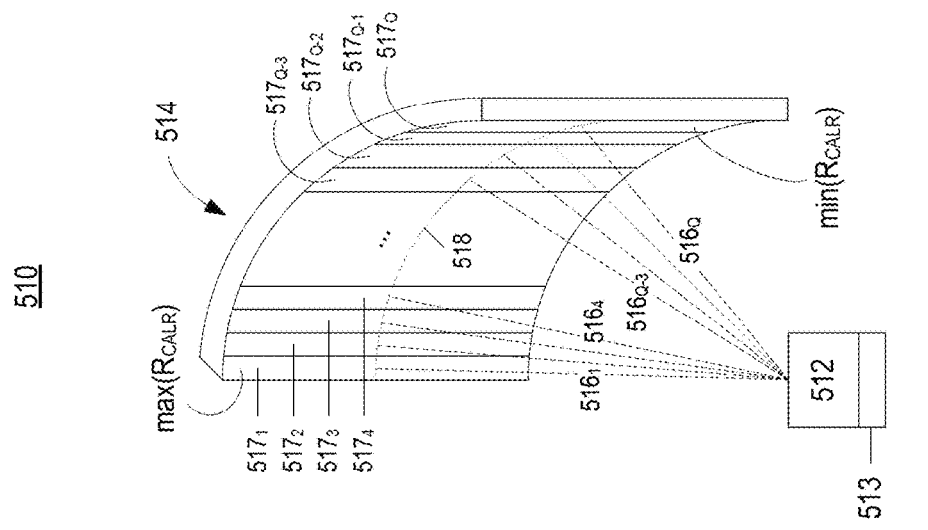
FIG. 5B shows a calibration environment for performing baseline reflectance calibration of a LiDAR device, in accordance with some embodiments.
Figure 5A:
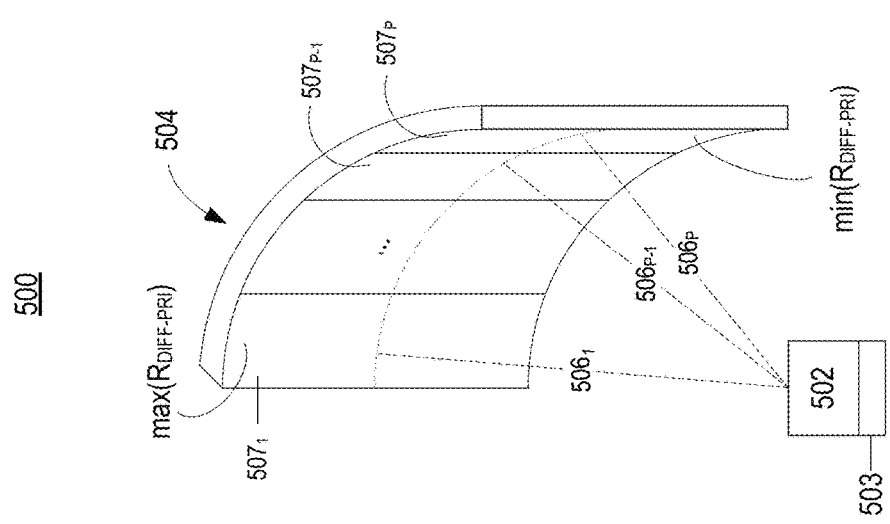
FIG. 5A shows an example of a calibration environment for performing baseline reflectance calibration of a LiDAR device.

FIG. 5A shows an example of a calibration environment 500 for performing baseline reflectance calibration of a LiDAR device within a diffuse reflectance range. The calibration environment 500 includes a LiDAR device 502 (the device being calibrated) and a reflective target 504 with a surface formed by a plurality of reflective panels $507_1$-$507_P$, where P is the number of reflective panels. The LiDAR device 502 may be disposed at a baseline range from the reflective panels 507. The baseline range may be, for example, 0.2-10 m (e.g., 2 m). Other baseline ranges may be used. The reflective panels 507 may be highly Lambertian. Some attributes and examples of highly Lambertian reflective panels are described above.

In the example of FIG. 5A, the surfaces of the different reflective panels 507 have different reflectance values, with the reflective panel $507_P$ having the lowest reflectance value $\min(R_{DIFF-PRI})$ of all the panels 507, the reflective panel $507_1$ having the highest reflectance value $\max(R_{DIFF-PRI})$ of all the panels 507, and the reflectance values of the panels $507_P$-$507_1$ increasing monotonically from $\min(R_{DIFF-PRI})$ to $\max(R_{DIFF-PRI})$. Other configurations of the calibration environment 500 are possible. For example, reflective panels 507 may be arranged such that their reflectance values do not increase monotonically from one end of the reflective target 504 to the other. Any suitable number of reflective panels 507 may be used, for example, 5-100 panels (e.g., 10 panels). The reflectance values of the panels 507 may sample the reflectance range [$\min(R_{DIFF-PRI})$, $\max(R_{DIFF-PRI})$] of the reflective target 504 uniformly (e.g., at regular intervals), non-uniformly (e.g., at irregular intervals), or in any other suitable way.

In the calibration environment 500, the reflectance values of all the panels 507 may fall within the primary portion $R_{DIFF-PRI}$ of the diffuse reflectance range, which includes nominal diffuse reflectance values between $\min(R_{DIFF-PRI})$ (e.g., 0% diffuse reflectance) and $\max(R_{DIFF-PRI})$ (e.g., 100% diffuse reflectance). Limiting the baseline reflectance calibration of the LiDAR device 502 to reflectance values within the primary portion $R_{DIFF-PRI}$ of the diffuse reflectance range may introduce errors into the LiDAR device's estimation of reflectance values for objects in the device's environment, for reasons that are described in more detail below with reference to FIG. 5C.

Within calibration environment 500, a process for performing baseline reflectance calibration of the LiDAR device 502 may involve the following steps. With the LiDAR device disposed at the baseline range from the reflective target 504, each channel of the LiDAR device 502 may be controlled to emit light signals toward reflection points on the surfaces of the reflective panels 507 at one or more (e.g., all) power levels of the channel transmitter and to receive return signals 506 reflected from the reflection points. For a given return signal S corresponding to a light signal emitted by a channel L with a transmitter operating at a power level P, the calibration process may include the following steps:

- determining the intensity (I) of the return signal;
- determining the baseline reflectance ($R_B$) of the return signal's reflection point (e.g., based on stored environmental data E indicating the positions and nominal diffuse reflectance values of the reflective panels 507), where $R_B$ is a value within the primary portion $R_{DIFF-PRI}$ of the diffuse reflectance range;
- generating a baseline reflectance mapping pair $\{I, R_B\}$ including the intensity (I) of the return signal and the baseline reflectance ($R_B$) of the return signal's reflection point; and
- storing the baseline reflectance mapping pair $\{I, R_B\}$ in a baseline reflectance table corresponding to the channel L and the transmitter power level P, with the baseline reflectance value indexed by the corresponding intensity value.

The above-described steps may be performed for each of the return signals S.

The above-described calibration process may be performed by a calibration module 503, which may control the LiDAR device 502 to emit light signals and receive return signals in accordance with the above-described process, perform the above-described data analysis steps (e.g., determine the signal intensity I and baseline reflectance $R_B$ for each of the return signals S), and store the baseline reflectance mapping pairs in the baseline reflectance map 320 for the LiDAR device 502. During the above-described calibration process, channels of the LiDAR device 502 may be controlled to emit light signals toward reflection points on the surfaces of the reflective panels 507 using any suitable technique. For example, the calibration module may use the environmental data E to determine the azimuths (horizontal) from the LiDAR device 502 to each of the reflective panels 507, and may control each of the channels 102 of the LiDAR device 502 to emit light signals along each of those azimuths. Some examples of techniques for controlling the channels 102 of a LiDAR device to emit light signals along particular azimuths are described above. The environmental data E, which indicate the reference reflectance values of the surfaces of the reflective panels 507 and the locations of the reflective panels 507 relative to the LiDAR device 502, may be obtained using any suitable technique. Some examples of techniques for generating and/or obtaining such environmental data are described above.

Figure 5C:
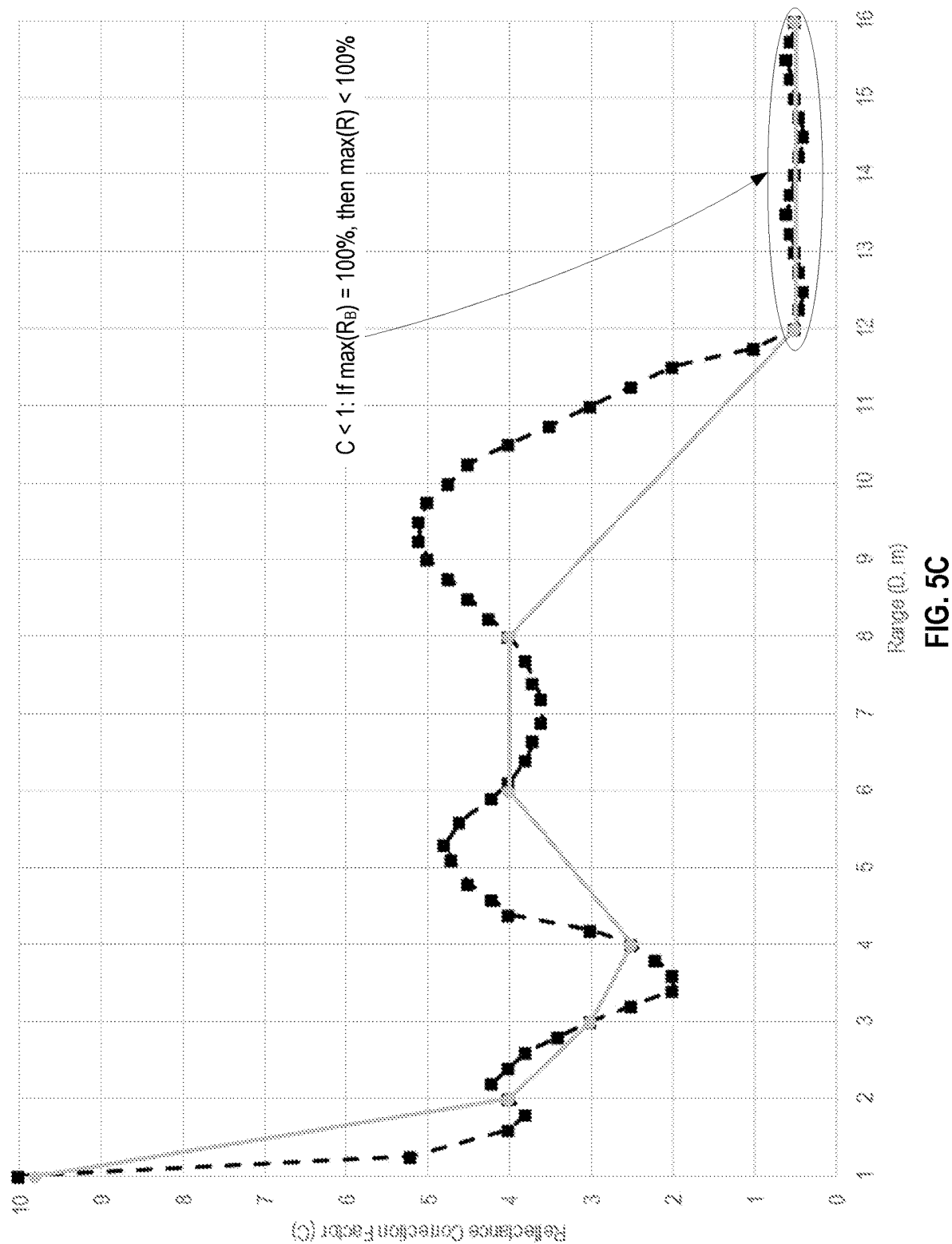
FIG. 5C shows an example of a scatter plot of reflectance correction factors.

FIG. 5C shows an example of a scatter plot of diffuse reflectance correction factors C for a LiDAR device, which illustrates why limiting the baseline reflectance calibration process to baseline reflectance values within the primary portion $R_{DIFF-PRI}$ of the diffuse reflectance range can introduce errors into the LiDAR device's estimation of reflectance values for objects in the device's environment. As previously discussed, a calibrated LiDAR device may estimate the reflectance R associated with a LiDAR point $Z=\{L_j, P_k, D_m, T_b, I_n\}$ using reflectance calibration expression 325:

$$R = 310\_T_bL_jP_k[I_n] * 320\_T_bL_j[D_m] = R_{Bn} * C_m = R_{mn},$$

where $L_j$ is the identifier of a channel that emits a light signal and receives the return signal, $P_k$ is the power level of the transceiver that emits the light signal, $D_m$ is the range from the surface that reflects the return signal to the LiDAR device (or to its channel $L_j$), $T_b$ is the reflectance type of the surface that reflects the return signal, $I_n$ is the measured intensity of the return signal, $310\_T_bL_jP_k[I_n]$ is the baseline reflectance $R_{Bn}$ associated with a return signal of intensity $I_n$ at channel $L_j$ when the corresponding emitted light signal is transmitted at power level $P_k$ and the reflectance type of the target is $T_b$, and $320\_T_bL_j[D_m]$ is the reflectance correction factor $C_m$ for points at range $D_m$ from the channel $L_j$ when the reflectance type of the target is $T_b$. However, the value of a LiDAR device's reflectance correction factor C in some portions of the range spectrum can be less than 1. For instance, in the example of FIG. 5C, the value of the reflectance correction factor is roughly 0.5 at ranges greater than 12 m. By inspection of expression 325, it can be appreciated that when the reflectance correction factor C for a LiDAR point Z is less than 1 and the maximum baseline reflectance value $R_B$ is 100% diffuse reflectance, the maximum reflectance R detectable by the LiDAR device for the point Z is less than 100% diffuse reflectance. In other words, at ranges where the reflectance correction factor C is less than 1, limiting the baseline reflectance calibration process to baseline reflectance values within the primary portion $R_{DIFF-PRI}$ of the diffuse reflectance range effectively renders the LiDAR device unable to distinguish the reflectance values of surfaces having reflectance values between C*100% diffuse reflectance and 100% diffuse reflectance.

One of ordinary skill in the art will appreciate that the foregoing analysis also applies to the retro-reflectance range. When performing baseline reflectance calibration within the retro-reflectance range $R_{RETRO}$, at ranges where the reflectance correction factor C is less than 1, limiting the baseline reflectance calibration process to baseline reflectance values within the primary portion $R_{RETRO-PRI}$ of the retro-reflectance range effectively renders the LiDAR device unable to distinguish the reflectance values of surfaces having reflectance values between C*100% retro-reflectance and 100% retro-reflectance.

FIG. 5B shows an example of a calibration environment 510 for performing baseline reflectance calibration of a LiDAR device within the a reflectance calibration range $R_{CALR}$. In some embodiments, the reflectance calibration range $R_{CALR}$ is the diffuse reflectance range $R_{DIFF}$, including the primary portion $R_{DIFF-PRI}$ (0-100% diffuse reflectance) and the extended portion $R_{DIFF-EXT}$ (100-800% diffuse reflectance) of the diffuse reflectance range. The calibration environment 510 includes a LiDAR device 512 (the device being calibrated) and a reflective target 514 with a surface (e.g., an arcuate surface) formed by a plurality of reflective panels $517_1$-$517_Q$, where Q is the number of reflective panels. The LiDAR device 512 may be disposed at a baseline range from the reflective panels 517. The baseline range may be, for example, 0.2-10 m (e.g., 2 m). Other baseline ranges may be used. In some embodiments, reflective panels 517 having reflectance values in the primary portion of the diffuse reflectance range are highly Lambertian. Some attributes and examples of highly Lambertian reflective panels are described above. Reflective panels 517 having reflectance values in the extended portion of the diffuse reflectance range may be obtained using techniques described below. The calibration environment 510 may also include a calibration device 513. The functions of some embodiments of the calibration device 513 are described in further detail below.

In the example of FIG. 5B, the surfaces of the different reflective panels 517 have different reflectance values within the reflectance calibration range $R_{CALR}$, with the reflective panel $517_Q$ having the lowest reflectance value $\min(R_{CALR})$ of all the panels 517, the reflective panel $517_1$ having the highest reflectance value $\max(R_{CALR})$ of all the panels 517, and the reflectance values of the panels $517_Q$-$517_1$ increasing monotonically from $\min(R_{CALR})$ to $\max(R_{CALR})$. Other configurations of the calibration environment 510 are possible. For example, reflective panels 517 may be arranged such that their reflectance values do not increase monotonically from one end of the reflective target 514 to the other. Any suitable number of reflective panels 517 may be used, for example, 10-100 panels (e.g., 60 panels). The reflectance values of the panels 517 may sample the reflectance range $[\min(R_{CALR}), \max(R_{CALR})]$ of the reflective target 514 uniformly (e.g., at regular intervals), non-uniformly (e.g., at irregular intervals), or in any other suitable way.

In some embodiments of the calibration environment 510, the reflectance value of each panel 517 may fall within the primary portion $R_{DIFF-PRI}$ of the diffuse reflectance range $R_{DIFF}$ (e.g., 0% to 100% diffuse reflectance) or within the extended portion $R_{DIFF-EXT}$ of the diffuse reflectance range $R_{DIFF-EXT}$ (e.g., 100% to 800% diffuse reflectance). Thus, in some embodiments, the minimum reflectance value min $(R_{CALR})$ of a reflective target 514 may be close to 0% diffuse reflectance, and the maximum reflectance value $\max(R_{CALR})$ may be close to 800% diffuse reflectance. Extending the baseline reflectance calibration of the LiDAR device 512 for targets having the diffuse reflectance type to reflectance values within the primary portion $R_{DIFF-PRI}$ of the diffuse reflectance range and the extended portion $R_{DIFF-EXT}$ of the diffuse reflectance range may enhance the accuracy of the LiDAR device's estimates of reflectance values for objects having diffuse reflective surfaces in the device's environment at ranges where the diffuse reflectance correction factor for the LiDAR device (or a channel thereof) is less than 1.

Examples have been described in which the reflectance calibration range $R_{CALR}$ is the diffuse reflectance range $R_{DIFF}$, and the reflectance values of the reflective panels 517 are within the primary portion of the diffuse reflectance range, or within the primary and extended portions of the diffuse reflectance range. In some embodiments, the reflectance calibration range $R_{CALR}$ is the retro-reflectance range $R_{RETRO}$, and the reflectance values of the reflective panels 517 are within the primary portion $R_{RETRO-PRI}$ of the retro-reflectance range (e.g., 0-100% retro-reflectance). (Obtaining reflective panels with reflectance values in the extended portion $R_{RETRO-EXT}$ of the retro-reflectance range (e.g., 100%-500% retro-reflectance) may be impractical or impossible.) In such embodiments, the minimum reflectance value $\min(R_{CALR})$ of a reflective target 514 may be close to 0% retro-reflectance, and the maximum reflectance value max $(R_{CALR})$ may be close to 100% retro-reflectance.

FIG. 5D shows a baseline reflectance map $530\_T_bL_j$ for targets of a reflectance type $T_b$ (e.g., the diffuse reflectance type or the retro-reflectance type) and a LiDAR channel $L_j$, in accordance with some embodiments. As can be seen, the baseline reflectance map $530\_T_bL_j$ includes baseline reflectance tables $530\_T_bL_jP_0$, $530\_T_bL_jP_1$, and $530\_T_bL_jP_2$, which correspond to respective power levels $P_0$, $P_1$, and $P_2$ of the transmitter of the LiDAR channel $L_j$. In some embodiments, each entry in a given baseline reflectance table $530\_T_bL_jP_k$ is a baseline reflectance value $R_{Bn}$ indexed by an intensity level $I_n$, which is the expected intensity level of a return signal received by the channel $L_j$ in response to the channel's transmitter emitting a light signal at power level $P_k$ and the return signal being reflected by a surface of reflectance type $T_b$ that has the baseline reflectance value and is disposed at the baseline range from the channel.

For ease of illustration and without limitation, the power levels $P_k$ and intensity levels $I_n$ represented in baseline reflectance tables $530\_T_bL_jP_k$ may be related as follows:

$$P_0 < P_1 < P_2; \text{ and}$$

$$I_0 < I_1 \ldots < I_n < I_{n+1} \ldots < I_{MAX}.$$

In some embodiments, different reflectance ranges map to different sets of intensity levels in the tables corresponding to the different power levels $P_k$. In the example of FIG. 5D, the primary portion $R_{CALR-PRI}$ of the reflectance calibration range $R_{CALR}$ maps to intensity levels $I_0$-$I_{11}$ in the table $530\_T_bL_jP_2$ corresponding to the high power level $P_2$, to intensity levels $I_0$-$I_7$ in the table $530\_T_bL_jP_1$ corresponding to the intermediate power level $P_1$, and to intensity levels $I_0$-$I_3$ in the table $530\_T_bL_jP_0$ corresponding to the intermediate power level $P_0$. Likewise, in the example of FIG. 5D, the extended portion $R_{CALR-EXT}$ of the diffuse reflectance range $R_{CALR}$ maps to intensity levels $I_{11}$-$I_{19}$ in the table $530\_T_bL_jP_2$ corresponding to the high power level $P_2$, to intensity levels $I_7$-$I_{14}$ in the table $530\_T_bL_jP_1$ corresponding to the intermediate power level $P_1$, and to intensity levels $I_3$-$I_9$ in the table $530\_T_bL_jP_0$ corresponding to the intermediate power level $P_0$.

In general, baseline reflectance mapping pairs $\{I_n, R_{Bn}\}$ may be determined by experimental measurement for reflectance values in the primary portion $R_{CALR-PRI}$ of the reflectance calibration range $R_{CALR}$. In some embodiments, the calibration environment 510 may be used to determine baseline reflectance mapping pairs by experimental measurement. In addition or in the alternative, baseline reference mapping pairs in the primary portion $R_{CALR-PRI}$ of the reflectance calibration range $R_{CALR}$ may be determined using extrapolation techniques and/or interpolation techniques, as described in further detail below.

In some embodiments, baseline reflectance mapping pairs $\{I_n, R_{Bn}\}$ for reflectance values in the extended portion of the diffuse reflectance range $R_{DIFF}$ may be determined by experimental measurement using a calibration environment 510 that includes reflective panels having reflectance values in the extended portion of the diffuse reflectance range. In addition or in the alternative, baseline reference mapping pairs in the extended portion $R_{CALR-EXT}$ of the reflectance calibration range $R_{CALR}$ may be determined using extrapolation techniques and/or interpolation techniques, as described in further detail below. In some embodiments, baseline reflectance mapping pairs $\{I_n, R_{Bn}\}$ for reflectance values in the extended portion of the retro-reflectance range $R_{RETRO}$ may be determined using extrapolation techniques (e.g., intensity level extrapolation and/or power level extrapolation).

Intensity level extrapolation: In some embodiments, given two baseline reflectance mapping pairs $\{I_x, R_{Bx}\}$ and $\{I_y, R_{By}\}$ for a power level $P_k$ of a channel $L_j$, the following approximate relationship may be observed, assuming the intensity has a linear scale with respect to the reflectance at the power level $P_k$:

$$I_x/I_y = R_{Bx}/R_{By}.$$

Thus, if a baseline reflectance mapping pair $\{I_x, R_{Bx}\}$ for a power level $P_k$ of a channel $L_j$ is known, one or more additional baseline reflectance mapping pairs $\{I_y, R_{By}\}$ for one or more additional reflectance values $R_{By}$ for the power level $P_k$ may be extrapolated by using the following estimate of the additional reflectance value $R_{By}$:

$$R_{By} = R_{Bx} * I_y / I_x.$$

Power level extrapolation: In some embodiments, given two baseline reflectance mapping pairs $\{I_n, R_{Bx}\}$ and $\{I_n, R_{By}\}$ for a return signal intensity level $I_n$ at two power levels $P_x$ and $P_y$ of a channel $L_j$, the following approximate relationship may be observed, assuming the power level has a linear scale with respect to the reflectance for return signals of intensity $I_n$:

$$P_x/P_y = R_{Bx}/R_{By}.$$

Thus, if a baseline reflectance mapping pair $\{I_n, R_{Bx}\}$ for a power level $P_x$ of a channel $L_j$ is known, one or more additional baseline reflectance mapping pairs $\{I_n, R_{By}\}$ for one or more additional power levels $P_y$ may be extrapolated by using the following estimate of the additional reflectance value $R_{By}$:

$$R_{By} = R_{Bx} * P_y/P_x.$$

In some cases, reflective panels having reflectance values in the extended portion of the diffuse reflectance range $R_{DIFF}$ may not be available for performing the baseline reflectance calibration of a LiDAR device. In such cases, a combination of experimental measurement (using an embodiment of the calibration environment 510) and extrapolation can be used to perform baseline reflectance calibration of a LiDAR device within the primary and extended portions of the diffuse reflectance range without using panels having reflectance values outside the primary portion of the diffuse reflectance range. In such cases, the reflectance value of each panel 517 may fall within the primary portion of the diffuse reflectance range $R_{DIFF}$ (e.g., 0% to 100% diffuse reflectance). In general, increasing the number of panels (and thereby sampling the primary portion of the diffuse reflectance range with greater resolution) may enhance the accuracy of baseline reflectance mapping pairs derived using interpolation or extrapolation, and therefore may enhance the accuracy of the LiDAR device's estimates of reflectance values for objects in the device's environment at ranges where the reflectance correction factor for the LiDAR device (or a channel thereof) is less than 1.

Likewise, reflective panels having reflectance values in the extended portion of the retro-reflectance range $R_{RETRO}$ may not be available for performing the baseline reflectance calibration of a LiDAR device. In such cases, a combination of experimental measurement (using an embodiment of the calibration environment 510) and extrapolation can be used to perform baseline reflectance calibration of a LiDAR device within the primary and extended portions of the retro-reflectance range without using panels having reflectance values outside the primary portion of the retro-reflectance range.

Figure 5E:
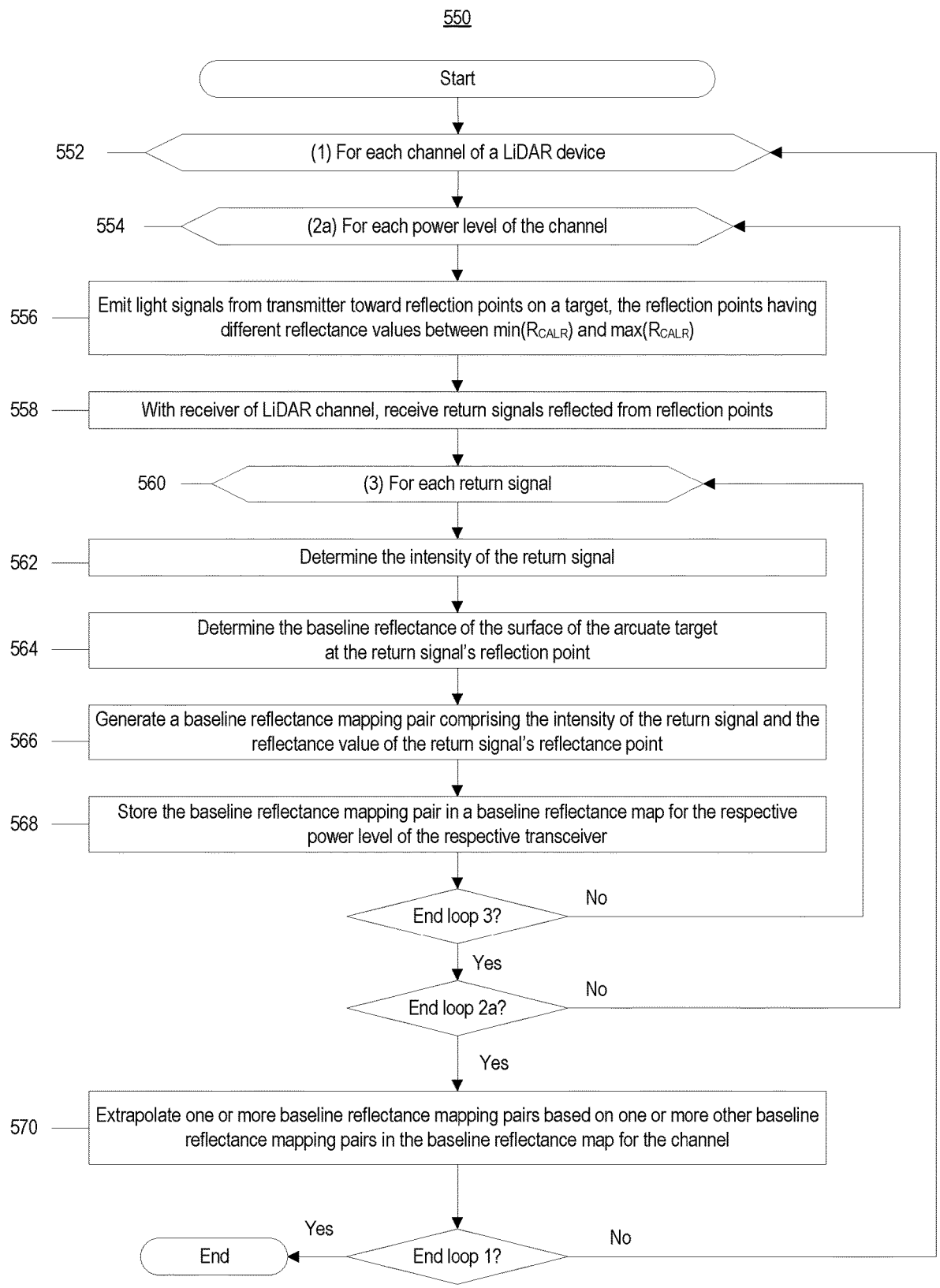
FIG. 5E shows a flowchart of a method for performing baseline reflectance calibration of a LiDAR device, in accordance with some embodiments.

Referring to FIG. 5E, an embodiment of a method 550 for performing baseline reflectance calibration of a LiDAR device is shown. The calibration method 550 may be suitable for performing baseline reflectance calibration of a LiDAR device 512 in a calibration environment 510, and/or with respect to reflectance values in primary and extended portions of a reflectance calibration range $R_{CALR}$ (e.g., the diffuse reflectance range $R_{DIFF}$ or the retro-reflectance range $R_{RETRO}$). As indicated by the loop headers 552 and 554, steps 556 and 558 of the method 550 may be performed for each power level $P_k$ of each channel $L_j$ of the LiDAR device 512. Likewise, as indicated by the loop header 560, steps 562-568 of the method 550 may be performed for each return signal received by the LiDAR device 512 during the calibration process. For simplicity, the following paragraphs describe steps 556 and 558 with reference to a single power level $P_k$ of a single channel $L_j$ of the LiDAR device 512, and describe steps 562-568 with reference to a single return signal received by a single channel of the LiDAR device. However, one of ordinary skill in the art will appreciate that steps 556 and 558 each may be performed in parallel by two or more (e.g., all) channels of the LiDAR device 512. Likewise, one of ordinary skill in the art will appreciate that the set of steps 562-568 may be performed in parallel (1) by a single channel of the LiDAR device 512 with respect to two or more return signals received by the channel, and/or (2) by two or more (e.g., all) channels of the LiDAR device 512 with respect to return signals received by the respective channels.

In step 556, the transmitter of a channel L of the LiDAR device 512 may emit one or more light signals toward reflection points on the surface of a reflective target 514. The light signals (1) may be emitted while the transmitter is operating at a power level $P_k$ and/or (2) may have the same power level $P_k$. The quantity and spatial distribution of the reflection points on the surface of the reflective target may be determined, for example, by a calibration device 513 that controls the operation of the LiDAR device 512 during the calibration process. In some embodiments, for each of the reflective panels 517 on the surface of the reflective target, the channel L may emit one light signal at power level $P_k$ toward a reflection point on the respective panel. Each of the reflective panels may have a reflectance value in the reflectance calibration range $R_{CALR}$. In some embodiments, at least one of the reflective panels 517 has a reflectance value in the primary portion of the reflectance calibration range $R_{CALR}$, and at least one of the reflective panels 517 has a reflectance value in the extended portion of the reflectance calibration range $R_{CALR}$. In some embodiments, all of the reflective panels 517 have reflectance values in the primary portion of the reflectance calibration range $R_{CALR}$. In some embodiments, the surface of the reflective target is arcuate.

In step 558, the receiver of the channel L receives one or more return signals 516 reflected from the set of reflection points. The glancing angles of the channel's return signals 516 with respect to the surface of the reflective target may be substantially the same. Likewise, the horizontal glancing angles of the channel L's return signals with respect to the surface of the reflective target may be substantially the same as the horizontal glancing angles of the other channels' return signals. In some embodiments, at least one of the return signals is reflected from a reflection point having a reflectance value in the primary portion of the reflectance calibration range $R_{CALR}$. In some embodiments, at least one of the return signals is reflected from a reflection point having a reflectance value in the extended portion of the reflectance calibration range $R_{CALR}$.

With respect to each of the return signals received by the channel L, in step 562, the channel L may determine the intensity (I) of the return signal. In step 564, the baseline reflectance ($R_B$) of the return signal's reflection point may be determined (e.g., based on stored environmental data E indicating the positions and nominal diffuse reflectance values of the reflective panels). In step 566, a baseline reflectance mapping pair $\{I, R_B\}$ including the intensity (I) of the return signal and the baseline reflectance ($R_B$) of the return signal's reflection point may be generated. In step 568, the baseline reflectance mapping pair $\{I, R_B\}$ may be stored in a baseline reflectance map 310 for the LiDAR device 512, in a table $310\_T_b L_j P_k$ corresponding to the reflectance type $T_b$ of the reflective panel that reflected the return signal and the power level $P_k$ of the channel $L_j$ associated with the return signal, with the baseline reflectance value ($R_B$) indexed by the intensity value (I).

The above-described steps of the calibration method 550 may be referred to herein as the "experimental phase" of the calibration method 550. The experimental phase of the calibration method 550 may be used to generate baseline reflectance mapping pairs of one or more (e.g., all) power levels of one or more (e.g., all) channels of the LiDAR device 512 for one or more baseline reflectance values in the primary portion of the reflectance range $R_{CALR}$ (e.g., the primary portion of the diffuse reflectance range or the retro-reflectance range) and/or in the extended portion of the reflectance range $R_{CALR}$ (e.g., the extended portion of the diffuse reflectance range).

In some embodiments, the calibration method 550 further includes an extrapolation phase, which may be used to generate baseline reflectance mapping pairs of one or more (e.g., all) power levels of one or more (e.g., all) channels of the LiDAR device 512 for one or more baseline reflectance values in the primary portion and/or the extended portion of the reflectance calibration range $R_{CALR}$ (e.g., the primary and/or extended portions of the diffuse reflectance range or the retro-reflectance range). In some embodiments, the extrapolation phase may be used to generate baseline reflectance mapping pairs for baseline reflectance values that were not evaluated during the experimental phase of the calibration method 550.

Still referring to FIG. 5E, the extrapolation phase may include step 570 of the calibration method 550. As indicated by the loop header 552, step 570 may be performed for one or more (e.g., all) channels of the LiDAR device 512. For simplicity, some embodiments of step 570 are described below with reference to a single channel L of the LiDAR device 512. However, one of ordinary skill in the art will appreciate that step 570 may be performed (e.g., in parallel) by two or more (e.g., all) channels of the LiDAR device 512.

In step 570, one or more new baseline reflectance mapping pairs $MP_{NEW}$ for the channel L may be extrapolated based on one or more reflectance mapping pairs $MP_{MAP}$ in the baseline reflectance map 310_L for the channel L. The new mapping pairs $MP_{NEW}$ may be extrapolated using "intensity level extrapolation" (see above) and/or "power level extrapolation" (see above). The baseline reflectance values $R_B$ for which baseline reflectance mapping pairs are extrapolated may be selected using any suitable technique.

When the calibration method 550 is performed, a set of two or more (e.g., all) channels of the LiDAR device 512 may scan the target's arcuate surface simultaneously. Together, this set of channels may have a vertical field of view (FOV) of, for example, 30-120 degrees. In some embodiments, during calibration, the channels may scan the reflective target 514 in a direction parallel to the LiDAR device's vertical FOV. For example, the LiDAR device 512 may be oriented with its vertical FOV approximately parallel to the width of the reflective target (e.g., in the x-direction in FIG. 5B), and the device's channels may simultaneously scan the reflective target 514 in a single track 518 along the target's width. To effectuate this type of scan, a calibration device 513 may hold the LiDAR device in the orientation with its vertical FOV approximately parallel to the width of the reflective target, and may rotate the LiDAR device around an axis orthogonal to the device's vertical FOV and parallel to the reflective target's height (e.g., the y-axis in FIG. 5B), such that the channels scan the target 514 in a single track 518.

The calibration device 513 may include, for example, a processor, a computer-readable storage medium (e.g., memory), and a robot arm. The memory may store a calibration program which, when executed by the processor, controls the robot arm to hold and rotate the LiDAR device 512 as described above, and communicates with the LiDAR device to perform the steps of a calibration method (e.g., calibration method 550). In some embodiments, the calibration device 423 and the calibration device 513 are the same device.

Alternatively, during calibration, the channels may scan the reflective target 514 in a direction orthogonal to the LiDAR device's vertical FOV. For example, the LiDAR device 512 may be oriented with its vertical FOV approximately parallel to the height of the reflective target (e.g., in the y-direction in FIG. 5B), and the device's channels may simultaneously scan the reflective target in vertically spaced tracks along the target's width (e.g., in the x-direction in FIG. 5B). When this alternative technique is used, during calibration, a calibration device 513 as described above may hold and rotate the LiDAR device, control the operation of the LiDAR device, and use the LiDAR device to perform the calibration method 550. Alternatively, during calibration, a calibration module as described above may control the operation of the LiDAR device, and use the LiDAR device to perform the calibration method 550. For example, the calibration module may use the environmental data E to determine the azimuths (horizontal) from the LiDAR device 512 to each of the reflective panels, and may control each of the channels 102 of the LiDAR device 512 to emit light signals along each of those azimuths. Some examples of techniques for controlling the channels 102 of a LiDAR device to emit light signals along particular azimuths are described above. The environmental data E, which indicate the reference reflectance values of the surfaces of the reflective panels and the locations of the reflective panels relative to the LiDAR device 512, may be obtained using any suitable technique. Some examples of techniques for generating and/or obtaining such environmental data are described above.

An example has been described in which a data collection stage of the experimental phase of the calibration method 550 (e.g., steps 554, 556, 558, and 562) is integrated with the mapping stage of the experimental phase (e.g., steps 566 and 568). In some embodiments, the data collection stage of the experimental phase of the calibration method 550 for a LiDAR device 512 may be performed in its entirety, and then the mapping stage of the experimental phase of the calibration method 550 for the LiDAR device 512 may be performed. In such embodiments, step 564 may be part of the data collection stage (e.g., the LiDAR device may determine the baseline reflectance value corresponding to each return signal's reflectance point) and/or part of the mapping stage (e.g., the LiDAR device may measure the intensity values and/or other properties of the return signals during the data collection stage, and the calibration device 513 may use those measurements to determine the baseline reflectance values corresponding to the return signals' reflectance points during the mapping stage).

An example of a high-resolution baseline reflectance calibration method 550 suitable for use in connection with a calibration environment 510 has been described. Examples of calibration environments 510 have also been described, including an example (Ex. 1) in which each reflective panel 517 has a reflectance value in the primary portion of the diffuse reflectance range, an example (Ex. 2) in which each reflective panel 517 has a reflectance value in the primary portion or the extended portion of the diffuse reflectance range, and an example (Ex. 3) in which each reflective panel 517 has a reflectance value in the primary portion of the retro-reflectance range. In connection with the calibration environments 510 of Ex. 1 and/or Ex. 2, performing the high-resolution baseline reflectance calibration method 550 may produce a baseline reflectance map 530 suitable for performing baseline reflectance correction on signals reflected by targets with diffuse reflective surfaces. In connection with the calibration environment 510 of Ex. 3, performing the high-resolution reflectance over range calibration method 550 may produce a baseline reflectance map 530 suitable for performing baseline reflectance correction on signals reflected by targets with retro-reflective surfaces. In some cases, the calibration method 550 may be performed in the calibration environment 510 of Ex. 1 or Ex. 2, and the calibration method 550 may be performed again in the calibration environment 510 of Ex. 3, thereby generating distinct baseline reflectance maps 530, each being suitable for the corresponding type of reflective surface.

In the calibration environment 510 of Ex. 2, the reflective target 514 may include reflective panels 517 having reflectance values of 100%, 200%, 300%, 400%, 500%, 600%, 700%, and 800% diffuse reflectance within the extended portion of the diffuse reflectance range. In the calibration environment 510 of Ex. 3, the reflective target 514 may include reflective panels 517 having reflectance values of 10%, 20%, 40%, 60%, 80%, and 90% retro-reflectance within the primary portion of the retro-reflectance range.

In some embodiments of the calibration environment 510, the reflective target 514 may include reflective panels having reflectance values that span the primary portion of the diffuse reflectance range, the extended portion of the diffuse reflectance range, and the primary portion of the retro-reflectance range. In some embodiments, such a reflective target 514 may be used to generate baseline reflectance maps 530 suitable for performing baseline reflectance correction on signals reflected by targets with diffuse reflective surfaces and on signals reflected by targets with retro-reflective surfaces.

Relative to a LiDAR device 502 calibrated using a baseline reflectance calibration process that is limited to baseline reflectance values within the diffuse reflectance range $R_{DIFF}$, a LiDAR device 512 calibrated in accordance with an embodiment of the method 550 may provide more accurate estimates of reflectance values for objects in the device's environment, particularly for objects at ranges for which the reflectance correction factor of the LiDAR device 512 (or a channel thereof) has a value less than 1. One of ordinary skill in the art will appreciate that such improved accuracy in the estimation of reflectance values may arise, at least in part, from the application of the calibration method 550 to reflectance values in the extended reflectance range(s) $R_{DIFF-EXT}$ and/or $R_{RETRO-EXT}$.

Figure 6A:
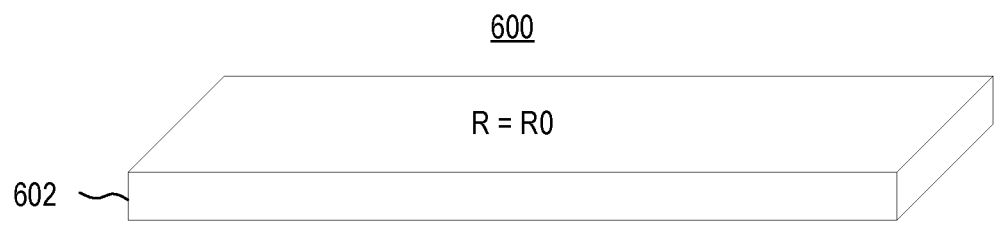
FIGS. 6A, 6B, and 6C illustrate states in a process of fabricating reflective panels having reflectance values in the retro-reflectance range, in accordance with some embodiments.
Figure 6B:
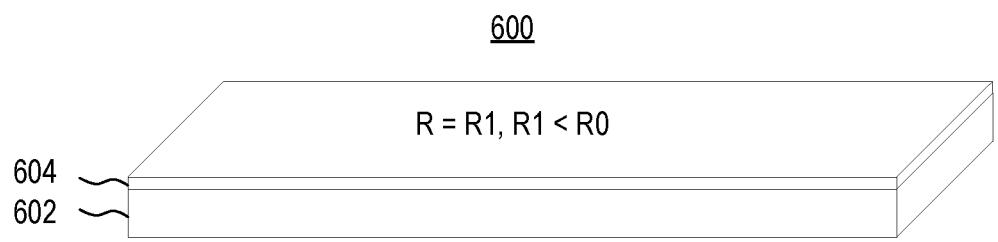
Figure 6C:
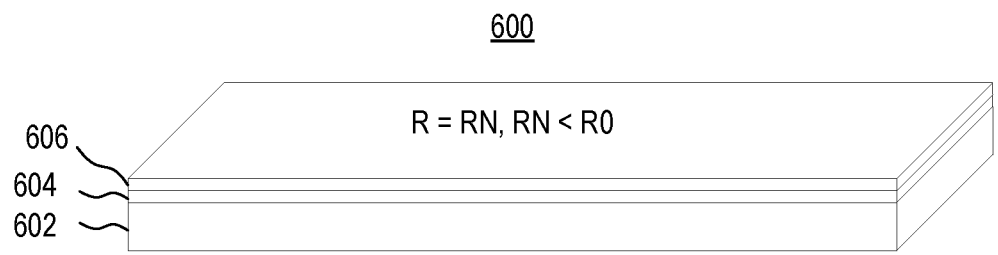

FIGS. 6A, 6B, and 6C illustrate states in a process of fabricating a reflective panel 600 having a surface reflectance in the retro-reflectance range, in accordance with some embodiments. Some embodiments of the fabrication process illustrated in FIGS. 6A-6C may be suitable for fabricating reflective panels 517 having surface reflectance values in the retro-reflectance range for the calibration environment 510. Referring to FIG. 6A, in some embodiments of the fabrication process, a base panel 602 with a surface reflectance $R_0$ in the retro-reflectance range is obtained. The surface of the base panel 602 may be formed from any suitable retro-reflective material (e.g., retro-reflective sheeting, such as retro-reflecting suitable for traffic signs), for example, 3M™ Diamond Grade™ DG³ Reflective Sheeting 4090. In some embodiments, the reflectance $R_0$ of the surface of the base panel 602 is the maximum reflectance in the retro-reflectance range. In some embodiments, the reflectance $R_0$ of the surface of the base panel 602 is in the upper half of the retro-reflectance range (e.g., in the 1st-50th percentile of reflectance values in the retro-reflectance range). In some embodiments, the reflectance $R_0$ is between approximately 100% and 800% diffuse reflectance.

Referring to FIG. 6B, in some embodiments of the fabrication process, one or more layers 604 of covering material are applied to the surface of the panel 600. Any suitable covering material may be used (e.g., ink, semi-transparent film or coating, etc.), and the layers of the covering material may be applied to the surface of the panel 600 using any suitable technique (e.g., silk screening, half-toning, staccato screening, etc.). In some embodiments, the application of each successive layer 604 may further reduce the panel's surface reflectance. Thus, following the application of the layer(s) 604, the surface reflectance of the panel 600 is $R_1$, where $R_1 < R_0$. In some embodiments, the covering material is opaque but only partially covers the underlying layer. For example, an opaque covering material may cover only a portion (e.g., 95%-99%) of the area within each square millimeter of the panel's surface.

Referring to FIG. 6C, in some embodiments of the fabrication process, an optional top layer 606 of protective material is applied to the surface of the panel 600 over the layer(s) 604. The optional top layer 606 may protect the surface of the panel 600 (e.g., from wear and tear). Any suitable protective material may be used, and the protective material may be applied to the surface of the panel 600 using any suitable technique. The application of the optional top layer 606 of protective material may increase or decrease the surface reflectance $R_1$ of the panel 600. Nevertheless, following the application of the top layer 606 of protective material, the surface reflectance of the panel 600 is $R_N$, where $R_N < R_0$.

FIG. 7 shows an environment 700 for performing reflectance over range calibration and/or baseline reflectance calibration of a LiDAR device 712, in accordance with some embodiments. The environment 700 includes an arcuate reflective target 702 and a LiDAR device 712. The arcuate reflective target 702 may include two components: a reflective target 414 having an arcuate surface 415 (e.g., as described above with reference to FIGS. 4B and 4C) and a reflective target 514 having a surface formed by a set of reflective panels 517 (e.g., as described above with reference to FIGS. 5B and 5D.

In some embodiments, the environment 700 includes a reflective target 414 having an arcuate surface 415 with a reflectance value in the primary portion of the diffuse reflectance range, and a reflective target 514 with reflective panels 517 having reflectance values within the primary portion of the diffuse reflectance range. Optionally, some of the reflective panels 517 may have reflectance values with the extended portion of the diffuse reflectance range. Such an environment 700 may be used to generate a baseline reflectance map 310 and a reflectance correction map 320 suitable for use with return signals reflected by diffuse reflective surfaces.

In some embodiments, the environment 700 includes a reflective target 414 having an arcuate surface 415 with a reflectance value in the primary portion of the retro-reflectance range, and a reflective target 514 with reflective panels 517 having reflectance values within the primary portion of the retro-reflectance range. Such an environment 700 may be used to generate a baseline reflectance map 310 and a reflectance correction map 320 suitable for use with return signals reflected by retro-reflective surfaces.

In some embodiments, the calibration method 550 and the reflective target 514 may be used to perform baseline reflectance calibration of the LiDAR device 712. In some embodiments, the calibration method 450 and the reflective target 414 may be used to perform reflectance over range calibration (e.g., high-resolution reflectance over range calibration) of the LiDAR device 712. The calibration methods 550 and 450 may be performed serially (e.g., the calibration method 550 may be performed prior to the calibration method 450), or portions of the calibration methods 550 and 450 may be performed in parallel.

In some embodiments, the environment 700 includes a calibration device 713. The calibration device 713 may include, for example, a processor, a computer-readable storage medium (e.g., memory), and a robot arm. The memory may store a calibration program which, when executed by the processor, controls the robot arm to hold and rotate the LiDAR device 712 in accordance with the steps of the calibration methods 450 and 550, and communicates with the LiDAR device 712 to perform the steps of the calibration methods 450 and 550. In some embodiments, the calibration device 713 performs the calibration method 550 in its entirety, and then performs the calibration method 450 in its entirety. In some embodiments, the calibration device 713 first performs the data collection stage of the experimental phase of the calibration method 550, then performs the data collection phase of the calibration method 450, and then performs the mapping stage of the experimental phase of the calibration method 550, the extrapolation phase of the calibration method 550, and the correction determination phase of the calibration method 450.

In some embodiments, the calibration process may include a validation step, whereby the baseline reflectance calibration and the reflectance over range calibration are validated. During the validation step, the calibration device 713 may control the LiDAR device 712 to scan a plurality of pre-determined reflection points ("validation points") on surface of the arcuate reflective target 702. After receiving the return signals reflected by the validation points in response to the LiDAR device targeting those points, the LiDAR device may estimate the reflectance of each of the validation points V corresponding to each of the return signals X using the reflectance calibration expression $R_V = 310\_L_j P_k [I_n] * 320\_L_j [D_m] = R_{Bn} * C_m$, where $R_V$ is the estimated reflectance of validation point V, $310\_L_j P_k [I_n]$ is the baseline reflectance value $R_{Bn}$ stored in the baseline reflectance map for a return signal X of intensity $I_n$ received at channel $L_j$ operating at power level $P_k$, and $320\_L_j [D_m]$ is the reflectance correction factor $C_m$ stored in the reflectance correction map for a return signal X at range $D_m$ received at channel $L_j$. The calibration device 713 may then compare the estimated reflectance values for the validation points to nominal reflectance values of the validation points to determine whether the LiDAR device is properly calibrated.

Further Description of Some Embodiments

One of ordinary skill in the art will appreciate that reflectance values in the extended portion of the diffuse reflectance range (e.g., 100%-800% diffuse reflectance) can overlap with reflectance values in the primary portion of the retro-reflectance range (e.g., 1%-8% retro-reflectance). Thus, when analyzing a return signal reflected by a surface having a reflectance value in the extended portion of the diffuse reflectance range, it may be difficult to determine whether the signal has been reflected by a diffuse reflective surface or by a retro-reflective surface, and therefore difficult to determine whether to process the return signal using the calibration maps (310, 320) associated with diffuse reflective surfaces or the calibration maps (310, 320) associated with retro-reflective surfaces. In some embodiments, when it is unclear whether a return signal has been reflected by a diffuse reflective surface or a retro-reflective surface, the LiDAR device may initially use the calibration maps associated with diffuse reflective surfaces to estimate the reflectance of the surface. If the estimated reflectance exceeds a threshold value (e.g., 90%-200% diffuse reflectance), the LiDAR device may use the calibration maps associated with retro-reflective surfaces to estimate the reflectance of the surface.

Figure 8:
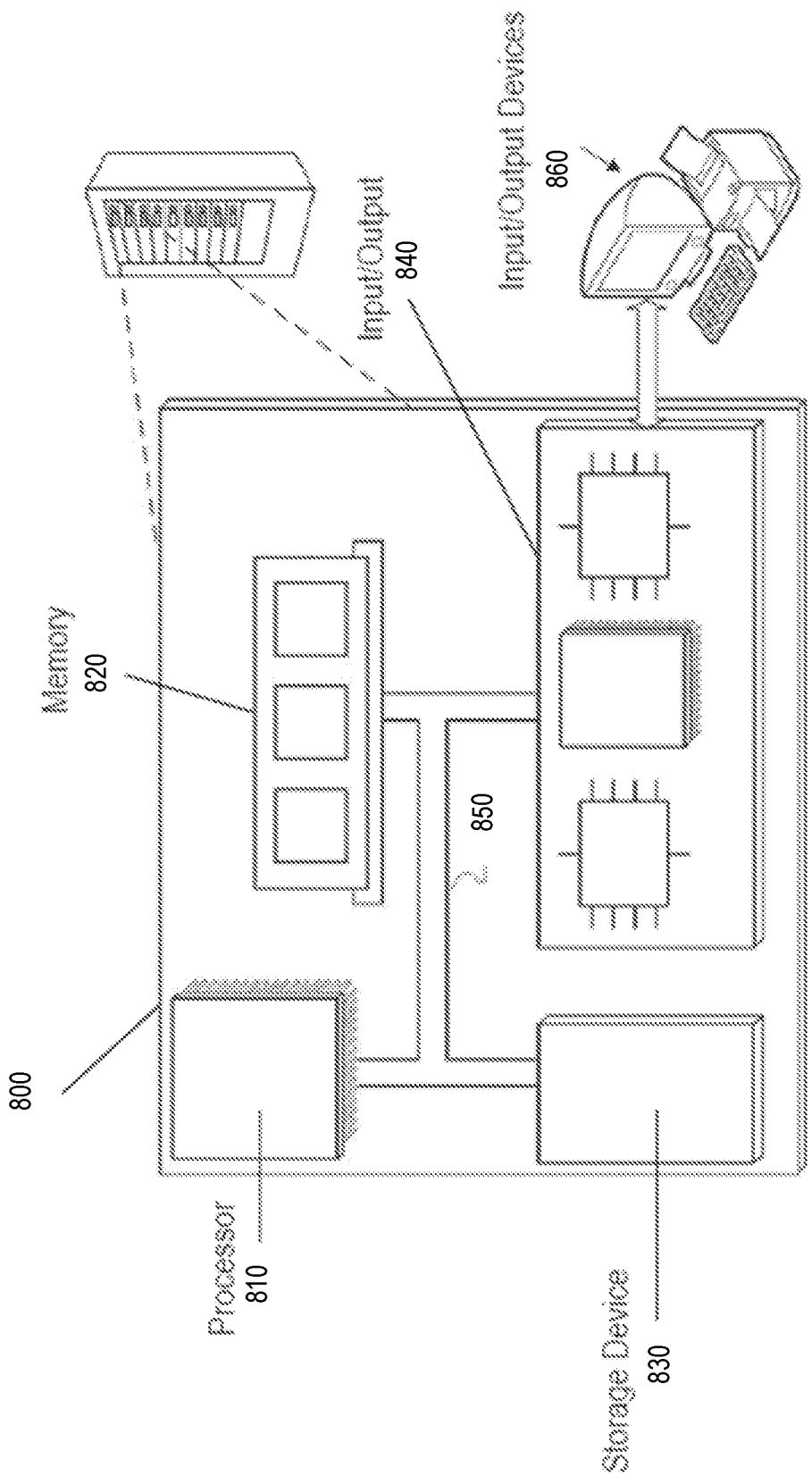
FIG. 8 is a block diagram of an example computer system.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system, comprising:
   a LiDAR device comprising a plurality of channels;
   a calibration target comprising a continuous curved concave reflective surface extending between first and second ends of the calibration target and positioned with respect to the LiDAR device such that the first end is at a first fixed distance from the LiDAR device and the second end is at a second fixed distance from the LiDAR device greater than the first fixed distance; and a calibration controller operable to perform a reflectance over range calibration of the LiDAR device by scanning, with the LiDAR device, portions of the continuous curved reflective surface of the calibration target with the plurality of channels; and wherein the calibration target is positioned and the reflective surface is configured such that, during the scanning, each channel in the plurality of channels scans a different range while glancing angles of return signals for each channel are substantially uniform.

2. The system of claim 1, wherein the calibration controller includes:
a robot arm operable to maneuver the LiDAR device with between one and six degrees of freedom;
a processing device; and
a computer-readable storage device storing instructions that, when executed by the processing device, cause the calibration controller to perform the reflectance over range calibration of the LiDAR device.

3. The system of claim 2, wherein the calibration further comprises:
holding, by the robot arm, the LiDAR device at an orientation with respect to the target, such that a vertical field of view (FOV) of the LiDAR device is substantially parallel to a width direction of the target.

4. The system of claim 3, wherein the calibration further comprises:
rotating, by the robot arm, the LiDAR device around an axis substantially parallel to a height dimension of the target, whereby a plurality of channels of the LiDAR device simultaneously scan the target in a same track extending along a surface of the target in the width direction of the target.

5. The system of claim 1, wherein the LiDAR device comprises a plurality of channels, and wherein scanning the portions of the continuous curved target at the plurality of different ranges comprises:
emitting, by each channel of the LiDAR device, a plurality of light signals directed toward a plurality of respective reflection points on a surface of the target;
receiving, by each channel of the LiDAR device, a plurality of return signals reflected from the plurality of respective reflection points on the surface of the target at a substantially constant glancing angle; and
for each of the return signals, determining, by the LiDAR device, a respective range from the LiDAR device to the respective reflection point of the return signal.

6. The system of claim 5, wherein the calibration further comprises generating a reflectance correction map for the LiDAR device based, at least in part, on information derived from the return signals.

7. The system of claim 6, wherein each of the return signals is associated with the range from the LiDAR device to the reflection point of the respective return signal and with the respective channel that receives the respective return signal, and wherein generating the reflectance correction map for the LiDAR device comprises, for each of the return signals:
determining, based on the respective return signal, a baseline reflectance of the surface of the target at the respective reflection point of the return signal;
obtaining a reference reflectance of the surface of the target at the respective reflection point of the return signal;
determining a reflectance correction factor for the channel and the range associated with the respective return signal, based on the baseline reflectance and the reference reflectance corresponding to the return signal; and
storing the reflectance correction factor for the associated channel and range in the reflectance correction map for the LiDAR device.

8. The system of claim 7, wherein the reflectance correction factor is determined based on a ratio between the reference reflectance corresponding to the return signal and the baseline reflectance corresponding to the return signal.

9. The system of claim 6, wherein the scanning of the portions of the continuous curved target is completed before the generating of the reflectance correction map is initiated.

10. The system of claim 6, wherein a reference reflectance of the surface of the target is between 1% and 100% diffuse reflectance, and wherein the reflectance correction map stores a plurality of reference correction factors corresponding to return signals reflected by diffuse reflective surfaces.

11. The system of claim 6, wherein a reference reflectance of the surface of the target is between 1% and 100% retro-reflectance, and wherein the reflectance correction map stores a plurality of reference correction factors corresponding to return signals reflected by retro-reflective surfaces.

12. A method for calibrating a LiDAR device, the method comprising:
performing reflectance over range calibration of a LiDAR device, by:
scanning, with the LiDAR device, portions of a concave continuous curved reflective surface of a calibration target, wherein the concave continuous curved reflective surface extends between first and second ends of the calibration target and is positioned, with respect to the LiDAR device, such that the first end is at a first fixed distance from the LiDAR device and the second end is at a second fixed distance from the LiDAR device greater than the first fixed distance; and
generating a reflectance correction map for the LiDAR device based, at least in part, on information derived from the scanning of the portions of the concave continuous curved reflective surface of the calibration target.

13. The method of claim 12, wherein the scanning comprises:
holding, by a robot arm, the LiDAR device at an orientation with respect to the continuous curved target, such that a vertical field of view (FOV) of the LiDAR device is substantially parallel to a width direction of the continuous curved target; and
rotating, by the robot arm, the LiDAR device around an axis substantially parallel to a height dimension of the continuous curved target, whereby a plurality of channels of the LiDAR device simultaneously scan the target in a same track extending along a surface of the target in the width direction of the target.

14. The method of claim 12, wherein the LiDAR device comprises a plurality of channels, and wherein scanning the portions of the continuous curved target comprises, at a plurality of different ranges:
emitting, by each channel of the LiDAR device, a plurality of light signals directed toward a plurality of respective reflection points on a surface of the target;
receiving, by each channel of the LiDAR device, a plurality of return signals reflected from the plurality of respective reflection points on the surface of the target at a substantially constant glancing angle; and for each of the return signals, determining, by the LiDAR device, a respective range from the LiDAR device to the respective reflection point of the return signal.

15. The method of claim 14, wherein each of the return signals is associated with the range from the LiDAR device to the reflection point of the respective return signal and with the respective channel that receives the respective return signal, and wherein generating the reflectance correction map for the LiDAR device comprises, for each of the return signals:

determining, based on the respective return signal, a baseline reflectance of the surface of the target at the respective reflection point of the return signal;

obtaining a reference reflectance of the surface of the target at the respective reflection point of the return signal;

determining a reflectance correction factor for the channel and the range associated with the respective return signal, based on the baseline reflectance and the reference reflectance corresponding to the return signal; and storing the reflectance correction factor for the associated channel and range in the reflectance correction map for the LiDAR device.

16. The method of claim 12, wherein the scanning of the portions of the continuous curved target is completed before the generating of the reflectance correction map is initiated.

* * * * *